United States Patent
Le et al.

(10) Patent No.: US 12,089,698 B2
(45) Date of Patent: *Sep. 17, 2024

(54) CUSHIONING ELEMENT AND SHOE

(71) Applicant: adidas AG, Herzogenaurach (DE)

(72) Inventors: Tru Huu Minh Le, Herzogenaurach (DE); Christopher Edward Holmes, Nuremberg (DE); Christopher Robertson, Herzogenaurach (DE); Maximilian Philipp Kurtz, Herzogenaurach (DE); Victor Romanov, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,627

(22) Filed: Sep. 13, 2022

(65) Prior Publication Data

US 2023/0000204 A1    Jan. 5, 2023

Related U.S. Application Data

(60) Continuation of application No. 16/838,242, filed on Apr. 2, 2020, now Pat. No. 11,470,913, which is a
(Continued)

(30) Foreign Application Priority Data

Feb. 5, 2015    (DE) .......................... 102015202013.4
Jan. 18, 2016   (EP) ...................................... 16151732

(51) Int. Cl.
*A43B 7/32*     (2006.01)
*A41D 13/015*   (2006.01)
(Continued)

(52) U.S. Cl.
CPC .............. *A43B 7/32* (2013.01); *A41D 13/015* (2013.01); *A43B 5/06* (2013.01); *A43B 13/04* (2013.01);
(Continued)

(58) Field of Classification Search
CPC .... B29D 35/142; B29D 35/14; B29D 35/122; B29D 35/12; B29D 35/0805; A43B 13/40;
(Continued)

(56) References Cited

U.S. PATENT DOCUMENTS 1,855,098 A    4/1932  Russell
2,787,809 A    4/1957  Stastny
(Continued)

FOREIGN PATENT DOCUMENTS

AT    505333      12/2008
CN    1087573     6/1994
(Continued)

OTHER PUBLICATIONS

Office Action, Chinese Patent Application No. 202110096056.1, May 31, 2022, 16 pages.
(Continued)

*Primary Examiner* — Stella K Yi
(74) *Attorney, Agent, or Firm* — Kilpatrick Townsend & Stockton LLP

(57) ABSTRACT

Described are methods for manufacturing a plastic component, in particular a cushioning element for sports apparel, a plastic component manufactured with such methods, for example a sole or a part of a sole for a shoe, and a shoe with such a sole. The method for the manufacture of a plastic component includes loading a mold with a first material includes particles of an expanded material and fusing the
(Continued)

surfaces of the particles by supplying energy. The energy is supplied in the form of at least one electromagnetic field.

17 Claims, 10 Drawing Sheets

Related U.S. Application Data division of application No. 15/016,095, filed on Feb. 4, 2016, now Pat. No. 10,645,992.

(51) Int. Cl.

| | | |
|---|---|---|
| A43B 5/06 | (2022.01) | |
| A43B 13/04 | (2006.01) | |
| A43B 13/12 | (2006.01) | |
| A43B 13/18 | (2006.01) | |
| B29C 35/08 | (2006.01) | |
| B29C 67/20 | (2006.01) | |
| B29D 35/12 | (2010.01) | |
| B29K 67/00 | (2006.01) | |
| B29K 75/00 | (2006.01) | |
| B29K 101/12 | (2006.01) | |
| B29K 105/00 | (2006.01) | |
| B29L 9/00 | (2006.01) | |
| B29L 31/50 | (2006.01) | |
| C08J 9/38 | (2006.01) | |

(52) U.S. Cl.
CPC .......... *A43B 13/125* (2013.01); *A43B 13/187* (2013.01); *B29C 35/0805* (2013.01); *B29C 67/205* (2013.01); *B29D 35/12* (2013.01); *B29D 35/122* (2013.01); *C08J 9/38* (2013.01); *B29C 2035/0811* (2013.01); *B29C 2035/0822* (2013.01); *B29C 2035/0827* (2013.01); *B29C 2035/0855* (2013.01); *B29C 2035/0861* (2013.01); *B29K 2067/003* (2013.01); *B29K 2067/006* (2013.01); *B29K 2067/046* (2013.01); *B29K 2075/00* (2013.01); *B29K 2101/12* (2013.01); *B29K 2105/251* (2013.01); *B29K 2995/0037* (2013.01); *B29L 2009/00* (2013.01); *B29L 2031/504* (2013.01); *C08J 2367/02* (2013.01); *C08J 2367/04* (2013.01); *C08J 2371/00* (2013.01); *C08J 2375/04* (2013.01); *C08J 2377/00* (2013.01)

(58) Field of Classification Search
CPC ..... A43B 13/188; A43B 13/186; A43B 13/18; A43B 13/12; A43B 13/026; A43B 13/023; A43B 9/16; A43B 7/32; A43B 3/246; A43B 3/244; A43B 3/128; A43B 3/108; A43B 13/187
See application file for complete search history.

(56) References Cited

U.S. PATENT DOCUMENTS

| | | | |
|---|---|---|---|
| 3,058,162 A | | 10/1962 | Grabowski |
| 3,193,876 A | | 7/1965 | Thompson |
| 3,315,317 A | | 4/1967 | Winkler |
| 3,413,682 A | | 12/1968 | Roland |
| 3,424,827 A | | 1/1969 | Galizia et al. |
| 3,598,672 A | | 8/1971 | Heller |
| 3,813,201 A | | 5/1974 | Frederick et al. |
| 4,035,216 A | * | 7/1977 | Immel .................. B29C 66/727 264/491 |
| 4,298,324 A | | 11/1981 | Soulier |
| 4,441,876 A | | 4/1984 | Marc |
| 4,483,809 A | | 11/1984 | Ando et al. |
| 4,902,721 A | | 2/1990 | Pham |
| 5,082,436 A | | 1/1992 | Choi et al. |
| 5,156,754 A | | 10/1992 | Nomura et al. |
| 5,194,190 A | | 3/1993 | Kim |
| 5,314,927 A | | 5/1994 | Kondo et al. |
| 5,396,249 A | * | 3/1995 | Yamada .............. H01Q 17/008 342/4 |
| 5,518,060 A | | 5/1996 | Bilderback et al. |
| 5,522,954 A | | 6/1996 | Bennett et al. |
| 5,667,737 A | | 9/1997 | Wittmann |
| 5,718,968 A | | 2/1998 | Cutler et al. |
| 5,736,167 A | | 4/1998 | Chang |
| 5,937,265 A | | 8/1999 | Pratt et al. |
| 6,042,764 A | | 3/2000 | Eder et al. |
| 6,086,808 A | | 7/2000 | Sorensen et al. |
| 6,165,300 A | * | 12/2000 | Elsner ................. B29C 44/1228 264/420 |
| 6,253,159 B1 | | 6/2001 | Bett et al. |
| 6,346,210 B1 | | 2/2002 | Swartz et al. |
| 6,432,320 B1 | | 8/2002 | Bonsignore |
| 6,464,922 B1 | | 10/2002 | Bogdan |
| 6,800,227 B1 | | 10/2004 | Nohara et al. |
| 7,992,243 B2 | | 8/2011 | Cook et al. |
| 8,302,649 B2 | | 11/2012 | Böl |
| 8,747,584 B2 | | 6/2014 | Knapp |
| D709,680 S | | 7/2014 | Herath |
| 8,922,641 B2 | | 12/2014 | Bertin et al. |
| 8,958,901 B2 | | 2/2015 | Regan |
| 9,027,623 B2 | | 5/2015 | Schip |
| D740,003 S | | 10/2015 | Herath |
| D740,004 S | | 10/2015 | Hoellmueller et al. |
| 9,212,270 B2 | | 12/2015 | Fuessi et al. |
| D758,056 S | | 6/2016 | Galway et al. |
| 9,498,927 B2 | | 11/2016 | Watkins et al. |
| D776,410 S | | 1/2017 | Galway et al. |
| D783,264 S | | 4/2017 | Hoellmueller et al. |
| 9,610,746 B2 | | 4/2017 | Wardlaw et al. |
| 9,781,970 B2 | | 10/2017 | Wardlaw et al. |
| 9,781,974 B2 | | 10/2017 | Reinhardt |
| 9,788,598 B2 | | 10/2017 | Reinhardt |
| 9,788,606 B2 | | 10/2017 | Reinhardt et al. |
| 9,795,186 B2 | | 10/2017 | Reinhardt et al. |
| 9,820,528 B2 | | 11/2017 | Reinhardt et al. |
| 9,849,645 B2 | | 12/2017 | Wardlaw et al. |
| 9,930,928 B2 | | 4/2018 | Whiteman et al. |
| 9,968,157 B2 | | 5/2018 | Wardlaw et al. |
| 10,039,342 B2 | | 8/2018 | Reinhardt et al. |
| D828,686 S | | 9/2018 | Hoellmueller et al. |
| D828,991 S | | 9/2018 | Herath |
| 10,259,183 B2 | | 4/2019 | Wardlaw et al. |
| D851,889 S | | 6/2019 | Dobson et al. |
| D852,475 S | | 7/2019 | Hoellmueller et al. |
| D853,691 S | | 7/2019 | Coonrod et al. |
| D853,699 S | | 7/2019 | Coonrod et al. |
| 10,357,904 B2 | | 7/2019 | Farris et al. |
| D873,543 S | | 1/2020 | Coonrod et al. |
| 10,639,861 B2 | | 5/2020 | Minh Le et al. |
| 10,645,992 B2 | | 5/2020 | Le et al. |
| 2001/0013459 A1 | | 8/2001 | Pattantyus-Abraham et al. |
| 2001/0048182 A1 | | 12/2001 | Caretta et al. |
| 2002/0170650 A1 | | 11/2002 | Chi et al. |
| 2003/0232933 A1 | | 12/2003 | Lagneaux et al. |
| 2004/0030435 A1 | | 2/2004 | Popp et al. |
| 2004/0032042 A1 | | 2/2004 | Chi |
| 2004/0222554 A1 | | 11/2004 | Akopyan |
| 2005/0110183 A1 | | 5/2005 | Buchel et al. |
| 2005/0116372 A1 | | 6/2005 | Bruning et al. |
| 2005/0144034 A1 | | 6/2005 | Hunter |
| 2006/0043645 A1 | | 3/2006 | Goettsch et al. |
| 2007/0029698 A1 | | 2/2007 | Rynerson et al. |
| 2007/0033750 A1 | | 2/2007 | Cook et al. |
| 2008/0224357 A1 | | 9/2008 | Allmendinger et al. |
| 2008/0277837 A1 | | 11/2008 | Liu et al. |
| 2008/0282579 A1 | | 11/2008 | Bobbett et al. |
| 2009/0013558 A1 | | 1/2009 | Hazenberg et al. |
| 2009/0072436 A1 | | 3/2009 | Dean |
| 2009/0142563 A1 | | 6/2009 | Zorn et al. |
| 2010/0181026 A1 | | 7/2010 | Bol |
| 2010/0239803 A1 | | 9/2010 | Farkas et al. |

(56) References Cited

U.S. PATENT DOCUMENTS

| | | |
|---|---|---|
| 2010/0267850 A1 | 10/2010 | Yoshida et al. |
| 2011/0232008 A1 | 9/2011 | Crisp |
| 2011/0265241 A1 | 11/2011 | Shiue |
| 2011/0266717 A1 | 11/2011 | Nehls |
| 2011/0297590 A1 | 12/2011 | Ackley et al. |
| 2012/0056345 A1 | 3/2012 | Lee et al. |
| 2012/0205435 A1 | 8/2012 | Woerz et al. |
| 2012/0272899 A1 | 11/2012 | Makover et al. |
| 2013/0125319 A1 | 5/2013 | Regan |
| 2013/0126075 A1 | 5/2013 | Jiang et al. |
| 2013/0150468 A1 | 6/2013 | Fuessi et al. |
| 2013/0203879 A1 | 8/2013 | Rensen et al. |
| 2013/0255103 A1 | 10/2013 | Dua et al. |
| 2013/0266792 A1 | 10/2013 | Nohara et al. |
| 2013/0267639 A1 | 10/2013 | Zhuang et al. |
| 2013/0291409 A1* | 11/2013 | Reinhardt ............ B29D 35/142 36/43 |
| 2013/0333950 A1 | 12/2013 | Atkins et al. |
| 2014/0000043 A1 | 1/2014 | Boardman et al. |
| 2014/0000044 A1 | 1/2014 | Boardman et al. |
| 2014/0017450 A1 | 1/2014 | Baghdadi et al. |
| 2014/0110491 A1 | 4/2014 | Roberts, Jr. |
| 2014/0189964 A1 | 7/2014 | Wen et al. |
| 2014/0223673 A1 | 8/2014 | Wardlaw et al. |
| 2014/0227505 A1 | 8/2014 | Schiller et al. |
| 2014/0243442 A1 | 8/2014 | Coles et al. |
| 2014/0259753 A1 | 9/2014 | Watkins et al. |
| 2014/0275306 A1 | 9/2014 | Watkins et al. |
| 2015/0038605 A1 | 2/2015 | Baghdadi |
| 2015/0076236 A1 | 3/2015 | Chen |
| 2015/0101133 A1 | 4/2015 | Manz et al. |
| 2015/0119482 A1 | 4/2015 | Kumar et al. |
| 2015/0166270 A1 | 6/2015 | Buscher et al. |
| 2015/0174808 A1 | 6/2015 | Rudolph et al. |
| 2015/0190830 A1 | 7/2015 | Regan et al. |
| 2015/0197617 A1 | 7/2015 | Prissok et al. |
| 2015/0237823 A1 | 8/2015 | Schmitt et al. |
| 2015/0344661 A1 | 12/2015 | Spies et al. |
| 2015/0366289 A1 | 12/2015 | Rustam et al. |
| 2016/0001476 A1 | 1/2016 | Sommer et al. |
| 2016/0015120 A1 | 1/2016 | Denison et al. |
| 2016/0037859 A1 | 2/2016 | Smith et al. |
| 2016/0039162 A1 | 2/2016 | Murphy et al. |
| 2016/0046751 A1 | 2/2016 | Spies et al. |
| 2016/0121524 A1 | 5/2016 | Daeschlein et al. |
| 2016/0200011 A1 | 7/2016 | Rothfuss et al. |
| 2016/0227876 A1 | 8/2016 | Le et al. |
| 2016/0244583 A1 | 8/2016 | Keppeler |
| 2016/0244584 A1 | 8/2016 | Keppeler |
| 2016/0244587 A1 | 8/2016 | Gutmann et al. |
| 2016/0278481 A1 | 9/2016 | Le et al. |
| 2016/0295955 A1 | 10/2016 | Wardlaw et al. |
| 2016/0302508 A1 | 10/2016 | Kormann et al. |
| 2016/0311993 A1 | 10/2016 | Zhang et al. |
| 2016/0332379 A1 | 11/2016 | Paternoster et al. |
| 2016/0346627 A1 | 12/2016 | Le et al. |
| 2017/0015825 A1 | 1/2017 | Ting et al. |
| 2017/0173910 A1 | 6/2017 | Wardlaw et al. |
| 2017/0253710 A1 | 9/2017 | Smith et al. |
| 2017/0259474 A1 | 9/2017 | Holmes et al. |
| 2017/0340067 A1 | 11/2017 | Dyckmans et al. |
| 2017/0341325 A1 | 11/2017 | Le et al. |
| 2017/0341326 A1 | 11/2017 | Holmes et al. |
| 2017/0341327 A1 | 11/2017 | Le et al. |
| 2018/0000197 A1 | 1/2018 | Wardlaw et al. |
| 2018/0035755 A1 | 2/2018 | Reinhardt et al. |
| 2018/0093437 A1 | 4/2018 | Wardlaw et al. |
| 2018/0154598 A1 | 6/2018 | Kurtz et al. |
| 2018/0206591 A1 | 7/2018 | Whiteman et al. |
| 2018/0235310 A1 | 8/2018 | Wardlaw et al. |
| 2018/0290349 A1 | 10/2018 | Kirupanantham et al. |
| 2018/0303198 A1 | 10/2018 | Reinhardt et al. |
| 2019/0021435 A1 | 1/2019 | Kormann et al. |
| 2020/0044326 A1 | 2/2020 | Olfert et al. |
| 2020/0113280 A1 | 4/2020 | Wardlaw et al. |
| 2020/0221820 A1 | 7/2020 | Le et al. |
| 2020/0230905 A1 | 7/2020 | Le et al. |
| 2020/0253328 A1 | 8/2020 | Reinhardt et al. |
| 2020/0307041 A1 | 10/2020 | Reuber et al. |
| 2021/0113893 A1 | 4/2021 | Le et al. |
| 2021/0161249 A1 | 6/2021 | Smith et al. |
| 2021/0195985 A1 | 7/2021 | Kormann et al. |
| 2021/0219655 A1 | 7/2021 | Duemler et al. |

FOREIGN PATENT DOCUMENTS

| | | |
|---|---|---|
| CN | 2501679 Y | 7/2002 |
| CN | 101060963 A | 10/2007 |
| CN | 101611082 A | 12/2009 |
| CN | 202895563 U | 4/2013 |
| CN | 103507208 A | 1/2014 |
| CN | 103978620 | 8/2014 |
| CN | 104302456 A | 1/2015 |
| CN | 104334043 | 2/2015 |
| CN | 105209233 | 12/2015 |
| CN | 205021904 | 2/2016 |
| CN | 105520278 | 4/2016 |
| CN | 205291380 U | 6/2016 |
| CN | 108472843 A | 8/2018 |
| CN | 109318487 A | 2/2019 |
| CN | 110831733 A | 2/2020 |
| DE | 1914537 | 4/1965 |
| DE | 1704502 A1 | 5/1971 |
| DE | 1729011 | 6/1971 |
| DE | 3032246 | 4/1982 |
| DE | 3229762 A1 | 2/1983 |
| DE | 3437786 | 4/1986 |
| DE | 29520911 U1 | 6/1996 |
| DE | 19633467 | 2/1998 |
| DE | 19648804 | 5/1998 |
| DE | 19654860 | 5/1998 |
| DE | 19704700 | 9/1998 |
| DE | 19860611 | 3/2000 |
| DE | 10117979 A1 | 8/2002 |
| DE | 69811251 | 1/2004 |
| DE | 202004003679 U1 | 5/2004 |
| DE | 102004049060 | 6/2005 |
| DE | 102004028462 | 12/2005 |
| DE | 202006009569 | 8/2006 |
| DE | 202007006164 U1 | 9/2007 |
| DE | 102006024940 | 12/2007 |
| DE | 102007054723 | 5/2009 |
| DE | 102009030678 | 4/2010 |
| DE | 102009004386 A1 | 7/2010 |
| DE | 202011109598 U1 | 2/2012 |
| DE | 102011108744 | 1/2013 |
| DE | 102012206094 | 10/2013 |
| DE | 102013012515 | 3/2014 |
| DE | 102013002519 | 8/2014 |
| DE | 102013108053 | 1/2015 |
| DE | 102013221018 | 4/2015 |
| DE | 102013221020 | 4/2015 |
| DE | 102014107847 | 12/2015 |
| DE | 102014216992 A1 | 3/2016 |
| DE | 102015202013 | 8/2016 |
| DE | 102015202014 | 8/2016 |
| DE | 102015224885 | 6/2017 |
| DE | 102020110352 A1 | 10/2020 |
| EP | 0165353 A1 | 12/1985 |
| EP | 0455835 A1 | 11/1991 |
| EP | 0578272 A1 | 1/1994 |
| EP | 0790010 | 8/1997 |
| EP | 0792593 A2 | 9/1997 |
| EP | 0976518 A2 | 2/2000 |
| EP | 1016354 | 7/2000 |
| EP | 1259365 A1 | 11/2002 |
| EP | 922559 | 3/2005 |
| EP | 1535714 A2 | 6/2005 |
| EP | 1990170 | 11/2008 |
| EP | 2202051 | 6/2010 |
| EP | 2564719 | 3/2013 |
| EP | 2649896 | 10/2013 |
| EP | 2684665 | 1/2014 |
| EP | 2764972 | 8/2014 |

(56) References Cited

FOREIGN PATENT DOCUMENTS

| | | |
|---|---|---|
| EP | 2767181 | 8/2014 |
| EP | 2786670 | 10/2014 |
| EP | 2845504 | 3/2015 |
| EP | 2862467 | 4/2015 |
| EP | 2865289 | 4/2015 |
| EP | 2984956 | 2/2016 |
| EP | 3053732 A1 | 8/2016 |
| EP | 2649896 A2 | 10/2016 |
| EP | 3114954 A1 | 1/2017 |
| EP | 2767183 | 4/2017 |
| EP | 3488723 A1 | 5/2019 |
| FR | 1207226 | 2/1960 |
| FR | 1484844 A | 6/1967 |
| GB | 1063353 | 3/1967 |
| GB | 1248314 A | 9/1971 |
| GB | 1275095 | 5/1972 |
| GB | 1417522 A | 12/1975 |
| GB | 1439101 | 6/1976 |
| JP | S48-045560 | 6/1973 |
| JP | S48-042216 | 12/1973 |
| JP | S49-020266 | 5/1974 |
| JP | 50155569 | 12/1975 |
| JP | 51112882 | 10/1976 |
| JP | 52136054 | 11/1977 |
| JP | 54114354 | 9/1979 |
| JP | 55129004 | 10/1980 |
| JP | 5620402 | 2/1981 |
| JP | S57-005009 U | 1/1982 |
| JP | 57180653 | 11/1982 |
| JP | 5821304 | 2/1983 |
| JP | S58-142828 | 8/1983 |
| JP | S60-500491 | 4/1985 |
| JP | S61-41402 A | 2/1986 |
| JP | 5677122 A | 4/1988 |
| JP | 6374629 | 4/1988 |
| JP | H07-059368 B2 | 3/1991 |
| JP | 6046483 | 6/1994 |
| JP | H06-218830 A | 8/1994 |
| JP | H06-305039 A | 11/1994 |
| JP | H07-186151 A | 7/1995 |
| JP | H08-052761 A | 2/1996 |
| JP | H08-131209 A | 5/1996 |
| JP | 08239570 | 9/1996 |
| JP | 3047622 | 9/1997 |
| JP | H09-322803 A | 12/1997 |
| JP | H10-058475 A | 3/1998 |
| JP | H10-138252 A | 5/1998 |
| JP | 11129275 | 5/1999 |
| JP | 11291275 | 10/1999 |
| JP | 2000037208 A | 2/2000 |
| JP | 2000190394 | 7/2000 |
| JP | 2000279205 A | 10/2000 |
| JP | 2002119302 | 4/2002 |
| JP | 2002-144366 A | 5/2002 |
| JP | 2003135105 | 5/2003 |
| JP | 2003310302 | 11/2003 |
| JP | 2006137032 | 6/2006 |
| JP | 2007504977 | 3/2007 |
| JP | 2008544009 | 12/2008 |
| JP | 2009518495 | 5/2009 |
| JP | 2012-504024 A | 2/2012 |
| JP | 2012517535 | 8/2012 |
| JP | 2014158708 | 9/2014 |
| JP | 2014531352 | 11/2014 |
| KR | 20100032561 A | 3/2010 |
| KR | 20160037252 A | 4/2016 |
| WO | 9420568 | 9/1994 |
| WO | 9955186 | 11/1999 |
| WO | 9956578 | 11/1999 |
| WO | 2002/004188 A1 | 1/2002 |
| WO | 2005026243 | 3/2005 |
| WO | 2005066250 | 7/2005 |
| WO | 2007082838 | 7/2007 |
| WO | 2008087078 | 7/2008 |
| WO | 2009036240 | 3/2009 |
| WO | 2009146368 | 12/2009 |
| WO | 2010136398 | 12/2010 |
| WO | 2011125540 | 10/2011 |
| WO | 2011134996 | 11/2011 |
| WO | 2012099784 | 7/2012 |
| WO | 2014046940 | 3/2014 |
| WO | 2014150122 | 9/2014 |
| WO | 2015052265 | 4/2015 |
| WO | 2015052267 | 4/2015 |
| WO | 2015075546 | 5/2015 |
| WO | 2016/023067 A1 | 2/2016 |
| WO | 2016/030026 A1 | 3/2016 |
| WO | 2016/030333 A1 | 3/2016 |

OTHER PUBLICATIONS

Office Action, Japanese Patent Application No. 2016-015404, Mar. 5, 2019, 6 pages.
"Plastic", Britannica Online Encyclopedia, Available online at: https://www.britannica.com/print/article/463684, Aug. 17, 2016, 15 pages.
U.S. Appl. No. 29/592,935, filed Feb. 3, 2017, Unpublished.
U.S. Appl. No. 29/592,946, filed Feb. 3, 2017, Unpublished.
U.S. Appl. No. 29/595,857, filed Mar. 2, 2017, Unpublished.
U.S. Appl. No. 62/137,139, filed Mar. 23, 2015, Unpublished.
U.S. Appl. No. 29/663,342, filed Sep. 13, 2018, Unpublished.
U.S. Appl. No. 29/643,233, filed Apr. 5, 2018, Unpublished.
U.S. Appl. No. 29/641,371, filed Mar. 21, 2018, Unpublished.
U.S. Appl. No. 29/663,029, filed Sep. 11, 2018, Unpublished.
U.S. Appl. No. 29/641,256, filed Mar. 20, 2018, Unpublished.
U.S. Appl. No. 29/641,223, filed Mar. 20, 2018, Unpublished.
U.S. Appl. No. 29/614,532, filed Aug. 21, 2017, Unpublished.
U.S. Appl. No. 29/664,097, filed Sep. 21, 2018, Unpublished.
U.S. Appl. No. 29/679,962, filed Feb. 12, 2019, Unpublished.
U.S. Appl. No. 16/353,374, filed Mar. 14, 2019, Unpublished.
U.S. Appl. No. 29/691,166, filed May 14, 2019, Unpublished.
U.S. Appl. No. 29/691,854, filed May 20, 2019, Unpublished.
U.S. Appl. No. 16/465,485, filed May 30, 2019, Unpublished.
U.S. Appl. No. 29/693,455, filed Jun. 3, 2019, Unpublished.
U.S. Appl. No. 29/694,634, filed Jun. 12, 2019, Unpublished.
European Application No. 16151732.1, Extended European Search Report mailed on Jun. 23, 2016, 8 pages.
Japanese Application No. 2016-015404, Office Action mailed on Jul. 3, 2018, 7 pages (4 pages of the original document and 3 pages of the English translation).
Chinese Application No. 201610080827.7, Office Action mailed on Sep. 1, 2017, 14 pages (7 pages of the original document and 7 pages of the English translation).
German Application No. 102015017075.9, Office Action mailed on Oct. 18, 2016, 6 pages (No English translation available. A summary of the Office Action is provided in the Transmittal Letter submitted herewith).
German Patent Application No. 102015202013.4, Office Action mailed Jun. 8, 2015, 5 pages (No English translation available. A summary of the Office Action is provided in the Transmittal Letter submitted herewith).
European Search Report, European Patent Application No. 20165349.0, Jul. 28, 2020, 11 pages.
U.S. Appl. No. 15/016,095, Advisory Action, Jun. 17, 2019, 6 pages.
U.S. Appl. No. 15/016,095, Final Office Action, Dec. 2, 2019, 6 pages.
U.S. Appl. No. 15/016,095, Final Office Action, Apr. 19, 2019, 9 pages.
U.S. Appl. No. 15/016,095, Non-Final Office Action, Oct. 15, 2018, 13 pages.
U.S. Appl. No. 15/016,095, Non-Final Office Action, Aug. 19, 2019, 7 pages.
U.S. Appl. No. 15/016,095, Notice of Allowance, Jan. 29, 2020, 11 pages.
U.S. Appl. No. 15/016,095, Restriction Requirement, Jul. 27, 2018, 8 pages.
U.S. Appl. No. 16/908,945, filed Jun. 23, 2020, Unpublished.

(56) References Cited

OTHER PUBLICATIONS

U.S. Appl. No. 16/918,014, filed Jul. 1, 2020, Unpublished.
U.S. Appl. No. 16/918,241, filed Jul. 1, 2020, Unpublished.
U.S. Appl. No. 16/918,905, filed Jul. 1, 2020, Unpublished.
U.S. Appl. No. 17/004,430, filed Aug. 27, 2020, Unpublished.
U.S. Appl. No. 29/730,512, filed Apr. 6, 2020, Unpublished.
U.S. Appl. No. 29/697,489, filed Jul. 9, 2019, Unpublished.
U.S. Appl. No. 29/719,889, filed Jan. 8, 2020, Unpublished.
U.S. Appl. No. 29/706,274, filed Sep. 19, 2019, Unpublished.
U.S. Appl. No. 29/721,029, filed Jan. 17, 2020, Unpublished.
Notification of Reexamination, Chinese Patent Application No. 201610080827.7, Jun. 19, 2020, 14 pages.
Office Action, Japanese Patent Application No. 2019-047194, May 19, 2020, 8 pages.
U.S. Appl. No. 29/760,713, filed Dec. 3, 2020, Unpublished.
U.S. Appl. No. 29/762,463, filed Dec. 16, 2020, Unpublished.
U.S. Appl. No. 29/767,743, filed Jan. 25, 2021, Unpublished.
U.S. Appl. No. 29/773,594, filed Mar. 10, 2021, Unpublished.
U.S. Appl. No. 29/774,470, filed Mar. 17, 2021, Unpublished.
U.S. Appl. No. 29/777,634, filed Apr. 7, 2021, Unpublished.
U.S. Appl. No. 17/380,956, filed Jul. 20, 2021, Unpublished.
U.S. Appl. No. 29/800,246, filed Jul. 20, 2021, Unpublished.
U.S. Appl. No. 17/384,557, filed Jul. 23, 2021, Unpublished.
U.S. Appl. No. 17/397,446, filed Aug. 9, 2021, Unpublished.
U.S. Appl. No. 17/399,842, filed Aug. 11, 2021, Unpublished.
Office Action, European Patent Application No. 20165349.0, Feb. 14, 2022, 5 pages.
Office Action, Chinese Patent Application No. 202110096127.8, May 31, 2022, 18 pages.
U.S. Appl. No. 16/838,242, Non-Final Office Action, Dec. 10, 2021, 6 pages.
U.S. Appl. No. 16/838,242, Final Office Action, Apr. 29, 2022, 6 pages.
U.S. Appl. No. 16/838,242, Notice of Allowance, Jun. 14, 2022, 6 pages.
"New Concept of Green", Zhongguancun Promotion Center for International Environmental Protection Industry et al., Beijing, 2004, 8 pages.
Office Action, Chinese Patent Application No. 202110096127.8, Jan. 4, 2023, 14 pages.
Office Action, Chinese Patent Application No. 202110096056.1, Jan. 3, 2023, 17 pages.
Office Action, Chinese Patent Application No. 202110096352.1, Nov. 2, 2022, 18 pages.
"From Cardiac Electricity Vector to Cardiac Electromagnetic", Accessed from the Internet on May 23, 2022, 2 pages.
"Modern Engineering Materials Handbook", Accessed from the Internet on May 23, 2022, 3 pages.
"New Technology in Food Industry and Application Thereof", Accessed from the Internet on May 23, 2022, 2 pages.
"Sports Shoes Design", Accessed from the Internet on May 20, 2022, 2 pages.
"Sports Shoes Design Materials", Accessed from the Internet on May 23, 2022, 3 pages.
Dieter, "Materials Selection and Design", ASM Handbook, vol. 20, Available Online at: https://app.knovel.com/hotlink/toc/id:kpASMHVMS2/asm-handbook-volume-20/asm-handbook-volume-20, 1997.
Decision of Rejection, Chinese Patent Application No. 202110096127.8, May 27, 2023, 16 pages.
Office Action, Chinese Patent Application No. 202110096056.1, Jun. 2, 2023, 16 pages.
Office Action, Japanese Patent Application No. 2022-161302, Dec. 5, 2023, 6 pages.
Shiyanjun et al., "Research on the Progress of Modern Materials Science", 2019, 9 pages.

* cited by examiner

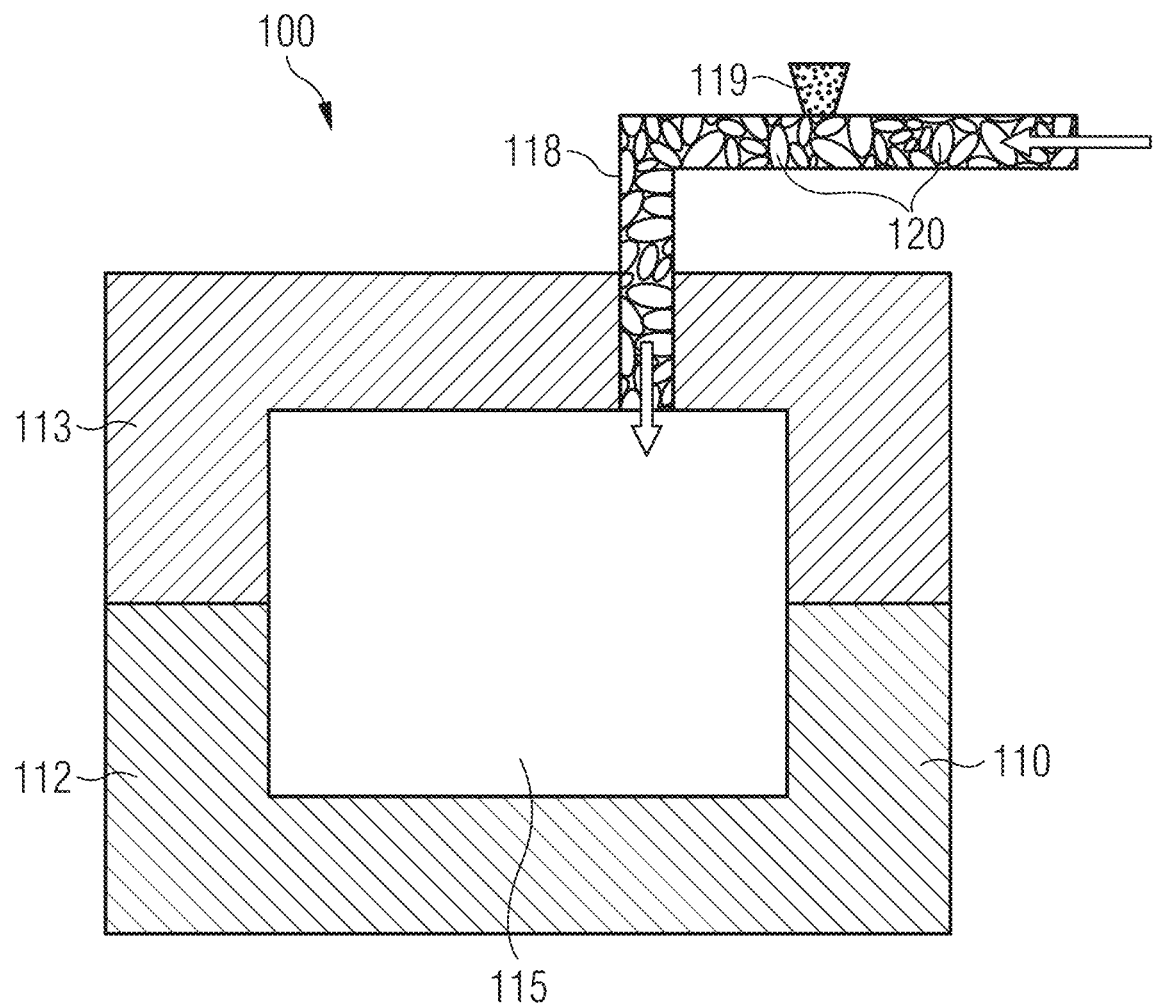

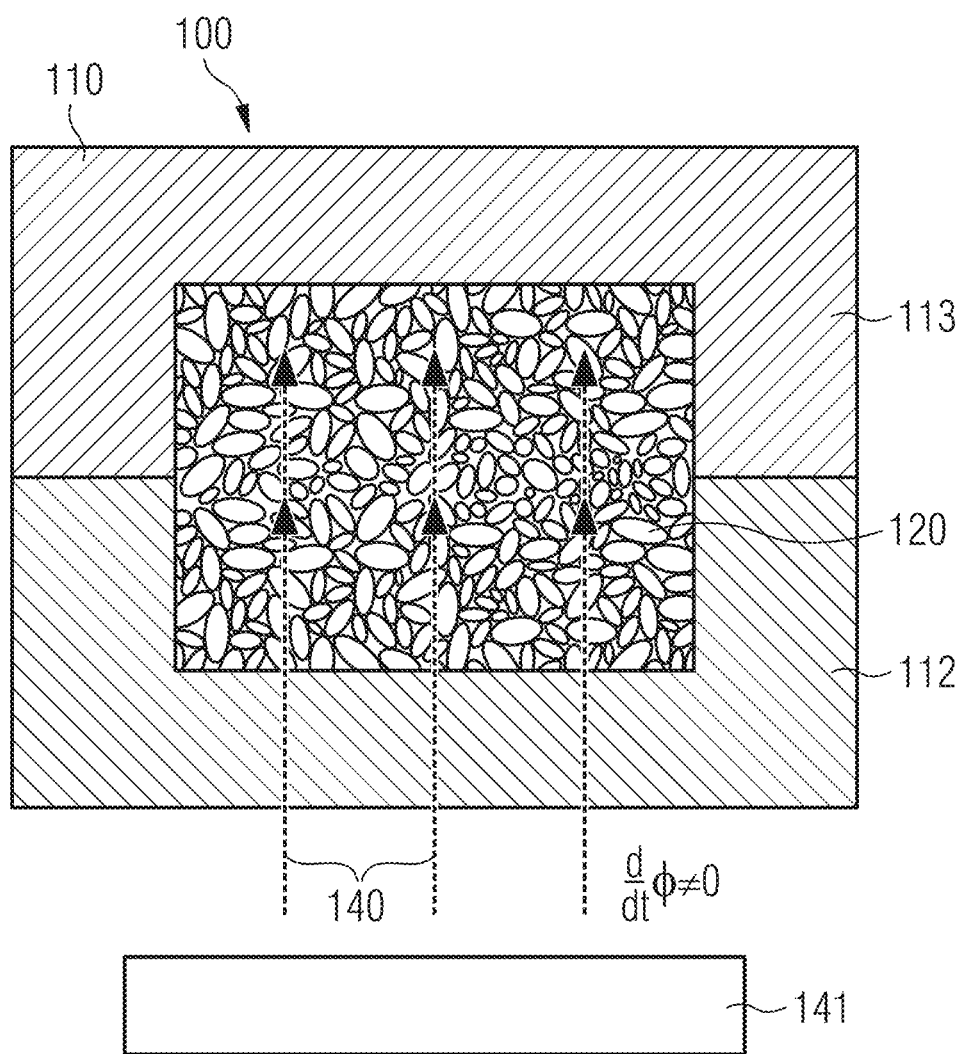

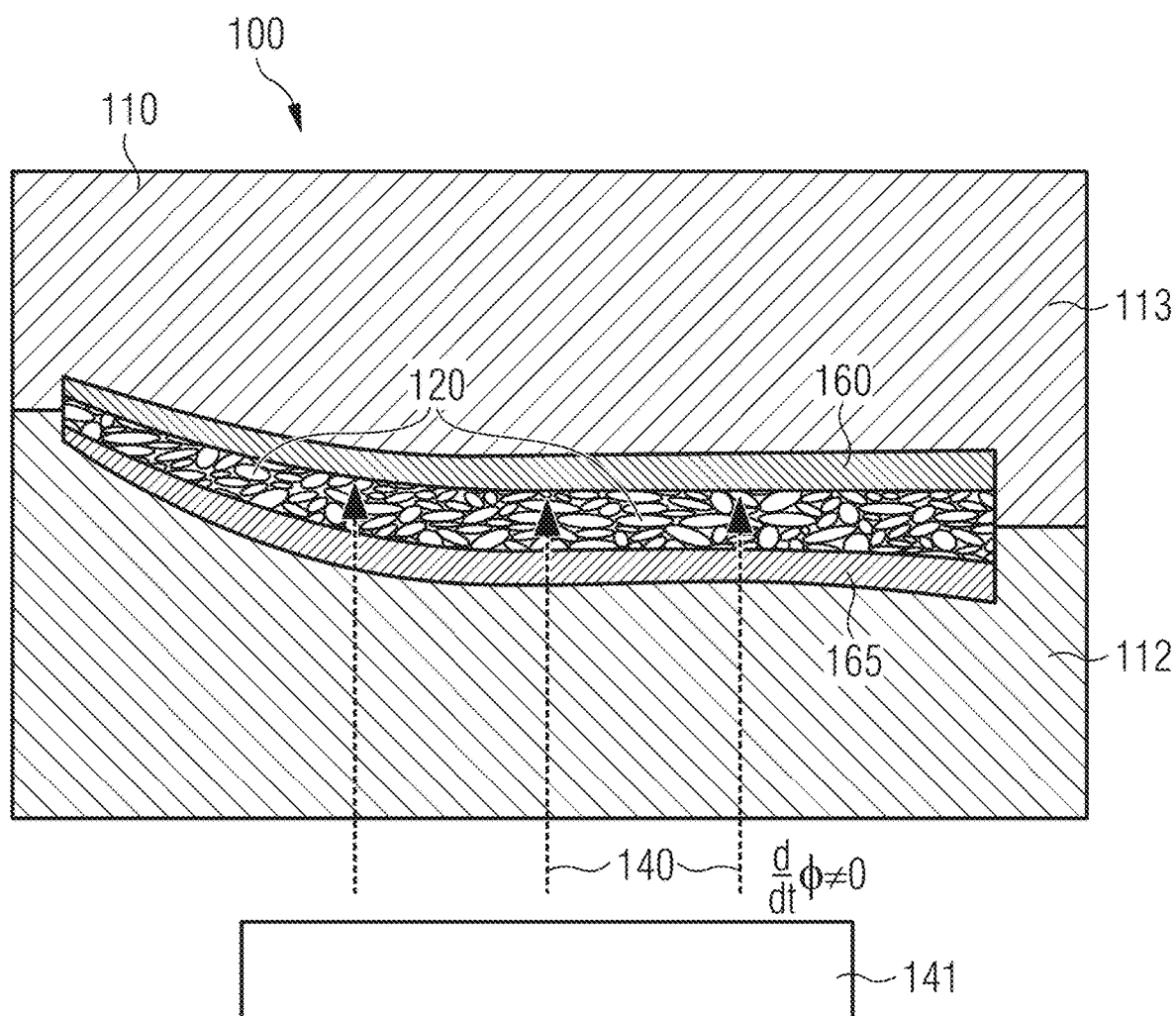

201

202

CUSHIONING ELEMENT AND SHOE

CROSS REFERENCE TO RELATED APPLICATION

This application is a continuation of U.S. patent application Ser. No. 16/838,242, filed Apr. 2, 2020 ("the '242 application"), now allowed, which is a divisional of U.S. patent application Ser. No. 15/016,095, filed on Feb. 4, 2016 ("the '095 application"), now U.S. Pat. No. 10,645,992, which is related to and claims priority benefits from German Patent Application No. DE 10 2015 202 013.4, filed on Feb. 5, 2015, entitled METHOD FOR THE MANUFACTURE OF A PLASTIC COMPONENT, PLASTIC COMPONENT, AND SHOE ("the '013 application"), and is related to and claims priority benefits from European Patent Application No. EP 16 151 732.1, filed on Jan. 18, 2016, entitled METHOD FOR THE MANUFACTURE OF A PLASTIC COMPONENT, PLASTIC COMPONENT, AND SHOE ("the '732 application"). The '242, '095, '013 and '732 applications are hereby incorporated herein in their entireties by this reference.

FIELD OF THE INVENTION

The present invention relates to a method for the manufacture of a plastic component, in particular a cushioning element for sports apparel, a plastic component manufactured with such a method, for example a sole or part of a sole for a shoe, as well as a shoe with such a sole.

BACKGROUND

Nowadays, plastic components play an essential role in many areas of technology and everyday life. As examples, the aviation and aerospace industry as well as the automotive industry are mentioned. In these areas, plastic components may, for example, serve as impact protection elements, e.g. bumpers, or they may be used for the manufacture of panel-elements, seat shells, arm rests, and so forth. Plastic components may also be used in the packing industry, for example for packing up sensitive and easily damaged goods for delivery.

In all of these exemplary areas of application, it is advantageous if the plastic components comprise as small a weight as possible, being, however, at the same time sufficiently resilient. In particular with regard to plastic components being used for impact protection or for safely wrapping up goods, plastic components should also comprise good cushioning and absorption properties with regard to blows or hits. In this context, foamed plastic materials are known from the prior art, like for example expanded polystyrene—e.g. available from the BASF under the trade names of Styropor® or Styrodur®.

The use of expanded plastic materials has also found its way into the manufacture of cushioning elements for sports apparel, for example for the manufacture of shoe soles for sports shoes. In particular the use of particles of expanded thermoplastic polyurethane (eTPU), which are fused together by supplying heat in the form of steam or connected by the use of a binder material as described in DE 10 2012 206 094 A1 and DE 10 2011 108 744 B1, was considered. The use of particles from eTPU has turned out advantageous in order to provide shoe soles or parts of soles with a low weight, good temperature stability and small hysteresis-losses with regard to the energy exerted for the deformation of the sole during running.

In addition, DE 10 2013 002 519 A1 discloses extended possibilities for the manufacture of cushioning elements for sports apparel from such particles, for example by loading a mold with the particles by means of a stream of liquid or steam.

Common to the methods known from the prior art is, however, that the processing of the base material to dimensionally stable components of a high quality is often only possible up to a certain thickness or a certain packing density, meaning that the possible shapes of components that can be manufactured may be limited. This is due to the fact that the manufacture methods known from the prior art necessitate supplying the binder material or heat energy also to the interior of the components. For a liquid binder material or heat energy supplied by steam, this is only possible to a limited degree for thicker components and/or may lead to imperfections, because "channels" or "inlet openings" are provided in the component to allow the binder or the steam to homogeneously infuse the base material within the mold. Moreover, in particular when using steam as an energy carrier, it turns out to be disadvantageous that a major share of the energy stored within the steam may be lost in the mold instead of being supplied to the particles/particle surfaces. This can, on the one hand, necessitate a long preheating phase until the mold is heated up to a saturation temperature, and can, on the other hand, delay stabilization and cooling of the fused component since the mold may have stored a large amount of heat energy that delays cooling. Therefore, the method can be protracted and very energy inefficient.

It is therefore an objective underlying the present invention to provide improved methods for the manufacture of plastic components, in particular of cushioning elements for sports apparel, which allow the manufacture of complexly shaped plastic components with potentially greater thickness and packing densities, without significantly compromising the quality of the finished components. Furthermore, the manufacturing effort shall be kept low and the manufacturing- and cooling duration short, and the method shall further be as energy efficient as possible while making do without poisonous or environmentally hazardous substances.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method for the manufacture of a plastic component comprises loading a mold with a first material which comprises particles of an expanded material, and fusing the surfaces of the particles by supplying energy, wherein the energy is supplied in the form of at least one electromagnetic field.

In some embodiments, the particles comprise one or more of the following materials: expanded thermoplastic polyurethane ("eTPU"), expanded polyamide ("ePA"), expanded polyetherblockamide, ("ePEBA"), polylactide ("PLA"), polyether-block-amide ("PEBA"), polyethylene terephthalate ("PET"), polybutylene terephthalate ("PBT"), and thermoplastic polyester ether elastomer ("TPEE").

According to some embodiments, the particles may further comprise an energy absorbing material, which absorbs the energy supplied by the at least one electromagnetic field such that the energy absorbing material contributes to the fusing of the surfaces of the particles. The particles may be provided with the energy absorbing material prior to the loading of the mold. The energy absorbing material may comprise water and/or may comprise a metal.

In some embodiments, the energy may be supplied in the form of radiation in the microwave range of 300 MHz-300 GHz. In further embodiments, the energy may be supplied in the form of radiation in the radio frequency range of 30 kHz-300 MHz. The energy may be supplied by electromagnetic induction.

In certain embodiments, the energy is supplied to the particles in a first partial region of the mold than in a second partial region of the mold. The energy may be supplied to the particles in a first partial region of the mold with an electromagnetic field with a first frequency (f1) and in a second partial region of the mold with an electromagnetic field with a second frequency (f2), wherein the second frequency (f2) is different from the first frequency (f1). The average amount of energy absorbing material per particle varies within the mold.

In some embodiments, the mold is further loaded with a second material, which is substantially unaltered by the at least one electromagnetic field.

In some embodiments, a ratio of the amount of energy absorbed by the first material to the total amount of energy absorbed by the first material and the mold lies in the range 1.0-0.2.

Certain embodiments of the present invention comprise a plastic component comprising a first material comprising particles of an expanded material, wherein the surfaces of the particles are fused to one another through application of energy in the form of at least one electromagnetic field. The particles may comprise an energy absorbing material, which absorbs the energy supplied by the at least one electromagnetic field such that the energy absorbing material contributes to the fusing of the surfaces of the particles.

In some embodiments, the plastic component is a cushioning element for sports apparel. Further embodiments comprise a shoe with the cushioning element described above.

BRIEF DESCRIPTION OF THE DRAWINGS

In the following detailed description, embodiments of the invention are described referring to the following figures:

FIGS. 1a-i are schematic representation of a manufacturing method, according to certain embodiments of the present invention.

BRIEF DESCRIPTION

Figure 1B:
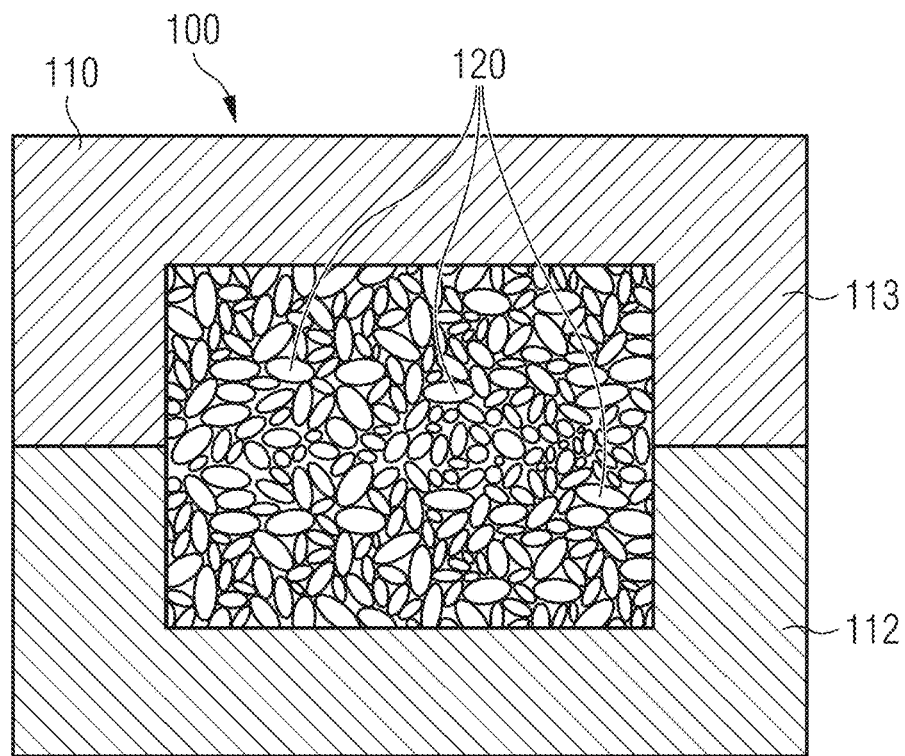

This objective is at least partially solved by a manufacturing method according to claim 1. In an embodiment, a method for the manufacture of a plastic component, in particular a cushioning element for sports apparel is provided. The method comprises loading a mold with a first material comprising particles of an expanded material and fusing the surfaces of the particles by supplying energy. The energy is supplied in the form of at least one electromagnetic field.

The use of one or more electromagnetic fields for supplying energy to the particles allows the manufacture of plastic components with various thicknesses and complex geometry, too, since supplying the energy is not coupled to any kind of material transport, as for example the introduction of a binder or steam. The at least one electromagnetic field may be chosen such that it permeates the mold loaded with the particles essentially homogeneously and supplies an essentially constant amount of energy to all particles, such that a homogeneous and constant fusing of the particle surfaces is achieved throughout the entire plastic component and in every depth of the component. Or, the at least one electromagnetic field is chosen such that the supply of energy to the particles arranged within the mold changes locally, as described in more detail in the following. In this way, the nature and degree of the fusing of the particle surfaces may be influenced locally. In particular, the fusing of the particle surfaces within the interior of the plastic component may be controlled independently of the fusing of the particle surfaces at the surface of the plastic component.

The density of the particles in the mold space can influence the energy absorption of the particles and, thus, the energy absorption of the part. Increasing the density of the particles can lead to improved heating. The improved heating is due to air having a low dielectric loss factor. Therefore, minimizing the air involved in the fusing process increases the absorption of the energy provided by the electromagnetic field, thus, improving the fusion of the particles.

For the same reasons a mold with a higher compression ratio of the particles or a larger crack gap will also result in better energy absorption due to the increased packing density of the particles. It is pointed out that this is particularly advantageous over the steam chest molding known from the prior art where it is known that an increased packing density increases cycle time due to the increased difficulty of heating the particle surfaces.

It is explicitly mentioned at this point that for clarity reasons, every kind of energy supply is linguistically associated with its own electromagnetic field within this application. When talking about "at least one electromagnetic field", this can therefore mean that at least one energy source is present which supplies the energy for the fusing in the form of "its electromagnetic field". It is, however, also possible that multiple energy sources are used or one energy source may emit radiation with different frequencies and so forth, such that in these cases multiple electromagnetic fields are (linguistically) made reference to. These fields superimpose at a given point in space to form the physical electromagnetic field at this point in space.

The particles may be randomly arranged. However, the particles or at least some of the particles may also be aligned to each other or be otherwise intentionally arranged within the mold.

The particles may, for example, comprise one or more of the following materials: expanded thermoplastic polyurethane (eTPU), expanded polyamide (ePA), expanded polyether-block-amide (ePEBA), polylactide (PLA), polyether-block-amide (PEBA), polyethylene terephthalate (PET), polybutylene terephthalate (PBT) and thermoplastic polyester ether elastomer (TPEE).

Other possible polymers used for making the expanded particles may be selected from at least one of polyamides, polyester, polyetherketones, and polyolefins. The polyamide can be at least one of homopolyamide, copolyamide, polyetherblockamide, and polyphthalamide. The polyetherketone can be at least one of polyether ketone (PEK), polyether ether ketone (PEEK), and polyetherketoneketone (PEKK). The polyolefin can be at least one of polypropylene (PP), polyethylene (PE), olefin co-block polymer (OBC), polyolefine elastomer (POE), polyethylene co-vinyl acetate (EVA), polybutene (PB), and polyisobutylene (PIB). The expanded polymer material include a suitable chain extender.

Moreover, the polymer may be selected from at least one of polyoxymethylene (POM), polyvinylidene chloride (PVCD), polyvinylalcohol (PVAL), polylactide (PLA), polytetrafluoroethylene (PTFE), polyvinylidene fluoride (PVDF), tetrafluoroethylene (FEP), ethylene-tetrafluoroethylene (ETFE), polyvinylfluoride (PVF), perfluoroalkoxy (PFA), and thermoplastic polyurethanes (TPU). For example, the polymer comprises polybutylene terephthalate (PBT) and the chain extender comprises at least one selected from a polymeric material containing epoxy groups, pyromellitic dianhydride, styrene maleic anhydride, or combinations of one or more thereof, in particular a styrene-acrylate copolymer containing reactive epoxy groups.

Further, the polymer may comprise polyamide (PA) or polyether-block-amide (PEBA) and the chain extender comprises at least one selected from a polymeric material containing epoxy groups, pyromellitic dianhydride, styrene maleic anhydride, or combinations of one or more thereof, in particular a styrene-acrylate copolymer containing reactive epoxy groups. Also, the polymer may comprise thermoplastic polyester ether elastomer (TPEE) and the chain extender comprises at least one selected from a polymeric material containing epoxy groups, pyromellitic dianhydride, styrene maleic anhydride, or combinations of one or more thereof, in particular a styrene-acrylate copolymer containing reactive epoxy groups.

Generally any polymer materials, e.g. semi-crystalline polymers, which absorb electromagnetic (RF) radiation to a sufficient degree, i.e. have a relatively high dielectric loss factor, may be used, such that no additional heat transfer medium is needed. Moreover, it is generally also possible to incorporate one or more additives into the polymer material to increase the dielectric loss factor.

Plastic components comprising particles from one or more of the materials mentioned above distinguish themselves by very good cushioning properties and a good elasticity and energy return, and they may at the same time be provided very lightweight. Their properties may also be temperature independent to a large extent. It may therefore be advantageous to use mixtures (or regions) of different expanded particles in the mold, which may then be formed into a component using the methods described herein.

It is further possible that the particles comprise an energy absorbing material which absorbs the energy supplied by the at least one electromagnetic field, such that the energy absorbing material contributes to the fusing of the surfaces of the particles.

The energy absorbing material can serve the purpose of increasing the amount of energy absorbed by the particles from the electromagnetic fields per time unit. This may accelerate the manufacture of that plastic component and make it more energy efficient. An energy absorbing material may also be used to locally influence the amount of absorbed energy and hence the degree to which the particle surfaces are fused together, as discussed in further detail below.

In case it is only dispensed on the surfaces of the particles, the use of an energy absorbing material can further have the advantage that the particles are fused together only at their surfaces, while the electromagnetic field permeates the interior of the particles without noticeably depositing energy there, such that the cell structure and hence the elastic properties of the particles may remain essentially unaltered in their interior.

The particles may be provided with the energy absorbing material prior to the loading of the mold.

Prior to being loaded into the mold, the particles may, for example, be stored in the energy absorbing material in a storage container and/or be intermixed, coated, soaked or impregnated with the energy absorbing material, and so forth. The energy absorbing material may e.g. be added to the particles in a feed line which is used for loading the mold with the particles. This may allow a dosed addition of the energy absorbing material such that the amount of energy absorbing material per particle may be adjusted and varied during the loading of the mold.

The energy absorbing material may, for example, comprise water.

Water is particularly cheap, environmentally friendly and easily handled and it has the further advantage that it does not enter into an undesirable chemical reaction with the particles which may, for example, influence the surface or cell structure or the appearance of the particles in an unwanted manner.

It is also possible that the energy absorbing material comprises a metal.

Metal, for example in the form of a metal powder, can be advantageous as it may absorb a particularly high amount of energy from the at least one electromagnetic field while at the same time being easily handled and dosed. A metal may, moreover, also serve the purpose of influencing the appearance of the plastic component, if desirable, for example to provide the plastic component with a metallic shininess.

The energy may, for example, be supplied in the form of radiation in the microwave range, i.e. with a frequency in the range from 300 MHz-300 GHz.

Microwave generators are commercially available and may be implemented into a manufacturing device for performing an inventive method with comparatively little effort. In addition, it may be possible to focus the microwave radiation essentially onto the cavity of the mold in which the particles of the expanded material are loaded by a suitable device, such that the energy efficiency of the method is increased. Furthermore, the intensity and frequency of the microwave radiation may easily be changed and adapted to the respective requirements.

The energy may also be supplied in the form of radiation in the radiofrequency range, i.e. with a frequency in the range from 30 kHz-300 MHz.

Radiofrequency generators are also commercially available and may be easily implemented in a manufacturing device. Moreover, also radiofrequency radiation may be focused on the respective parts of the manufacturing device and its intensity and frequency may be adapted to the requirements.

It is further possible that the energy is supplied in the form of radiation in a frequency range different from the frequency ranges mentioned above.

As a specific example, the energy may be supplied in the form of infrared (IR) radiation. The use of ultraviolet (UV) radiation may also be considered.

It is furthermore possible that the energy is supplied by electromagnetic induction.

In any of the above cases, i.e., supplying energy via radiation or electromagnetic induction, the component essentially contains no additional water, compared with steam chest molding. This allows the manufactured components to go straight to further processing steps. For example, the further manufacturing steps of assembly (e.g., of a sole or sports apparel in general) and/or attaching to an upper can directly follow the manufacture of the component (for example, the further manufacturing steps may involve infrared welding and/or RF fusing).

The process of manufacture as described herein is therefore advantageous for manufacturing customized sports apparel such as shoes. In particular, the sports apparel may be manufactured in a store using a suitable method for manufacture as described herein. The process of customized manufacture of sports apparel is described in further detail in the European patent applications EP 2 862 467 A1 and EP 2 865 289 A1 of Applicant.

Electromagnetic induction describes the creation of an electric field by means of a temporal variation of the magnetic flux. Hence, also in the case of electromagnetic induction, energy is supplied in the form of a temporally varying electromagnetic field. Electromagnetic induction may in particular be used to fuse the particle surfaces, if the particles or their surfaces comprise a material or are coated with a material which comprises a certain electric conductivity. Then, the electric field created by the electromagnetic induction can create currents in this material, which heat up the particle surfaces. This may allow the selective and locally focused supply of energy. Hence, the degree of the fusing of the particles at their surfaces may be influenced and controlled very precisely, also for particles arranged within the interior of the plastic component.

Whether the use of radiation in the microwave range, radiation in the radiofrequency range, or electromagnetic induction is more advantageous may, for example, depend on the question from which material the mold is made. Preferably, one chooses the option in which the mold absorbs the smallest possible amount of energy from the used electromagnetic field(s). It is, of course, also possible that combinations of the above mentioned options are used.

It is further possible that more energy is supplied to the particles in a first partial region of the mold than in a second partial region of the mold.

In this way, different partial regions may be created within the plastic component, which differ in their respective thickness, stiffness, breathability, flexibility, elasticity, feel, appearance or with regard to other characteristics, wherein potentially the same base material may be used, which might facilitate the manufacture.

In this document, the amount of energy which is supplied to the particles preferably designates the amount of energy that is actually absorbed by the particles from the electromagnetic field(s).

It is, for example, possible that energy is supplied to the particles in a first partial region of the mold with an electromagnetic field with a first frequency and in a second partial region of the mold with an electromagnetic field with a second frequency, wherein the second frequency differs from the first frequency.

Energy may, for example, be supplied to the particles in the first partial region of the mold with electromagnetic radiation with a higher frequency than in the second partial region of the mold. Herein, both kinds of radiation with their differing frequencies may, for example, originate from a single radiation source, or separate radiation sources may be used that each emit radiation with one of the two frequencies. A generalization to multiple kinds of radiation with more than two different frequencies is also possible.

It is further possible that the intensity of the radiation (or of the different kinds of radiation) varies locally in different regions of the mold and that, in this way, the degree of the fusing of the particle surfaces may be influenced.

On the other hand, to allow enable consistent energy application to parts with varying component thickness, (in shoe manufacture of midsoles, varying component thickness is sometimes referred to as wall thickness), the tool thickness could be varied. For example, higher density material may heat quicker, and, therefore, the tool may be locally adjusted to absorb more energy to balance with the energy absorbtion of the lower density areas. This may be advantageous because it is easier to apply a constant electromagnetic field than to apply a varying electromagnetic field. Thus, by varying the density of the material, the properties of the component may be influenced in a simpler way than by applying varying electromagnetic fields (e.g., varying in frequency).

It is further possible that the average amount of energy absorbing material per particle varies within the mold.

This provides a possibility which is complementary to the above mentioned options of changing the properties of the electromagnetic field(s) to locally influence the amount of energy which is supplied to the particles (i.e. the amount of energy which is actually absorbed by the particles). It is, for example, possible that, prior to loading the mold, a certain amount of particles is pre-mixed with different amounts of energy absorbing material and that the different mixtures are then positioned in different partial regions of the mold according to the desired degree of fusing. Or, the energy absorbing material may be added to the particles in a dosed manner during the loading of the mold, for example in a feed line, such that the content of energy absorbing material of the particles loaded into the mold may be varied.

The mold may further be loaded with a second material which remains essentially unaltered by the at least one electromagnetic field.

This may, for example, be a material the electromagnetic field permeates without being absorbed by the material to a noticeable degree. In particular, the second material may be free from energy absorbing material. Essentially unaltered may mean that the second material does not melt or start melting or become softer or harder.

The second material may, for example, also comprise particles of an expanded material, in particular particles of eTPU, ePA, ePEBA, PLA, PEBA, PET, PBT and/or TPEE. Other examples have been described above.

Hence, an inventive manufacturing method may allow manufacturing a plastic component from a single base material which comprises partial regions that are e.g. strongly fused and/or stiffer and/or impermeable to air, as well as partial regions comprising a loose assemblage of the particles such that the plastic component may comprise a lower stiffness but higher breathability in these regions, and so forth.

The manufacturing method may also involve a step of stabilizing the particle foam component after fusing. This may be done by keeping the component in the tool after fusing so that the component maintains the desired part shape. The greater the volume of material in the mold the more beneficial it is to stabilize the component. The stabilization step may also include means, for example, cooling channels, to permit control of the rate at which the component cools and, thus, is stabilized.

The manufacturing method may also involve the additional step of using a foil to form a skin on the particle foam. The foil can be fused with the external foam particles. In one example, this can be TPU, but also other materials that exhibit a high degree of polarity for bonding may be used, such as PVC, which is the most sensitive in terms of polarity.

The particles of the second material may be randomly arranged. Or, the particles or at least some of the particles of the second material may be aligned to each other or be otherwise intentionally arranged within the mold.

A ratio of the amount of energy absorbed by the first material to the total amount of energy absorbed by the first material and the mold may lie in the range 1.0-0.2, or it may lie in the range 1.0-0.5, or it may even lie in the range 1.0-0.8.

In case a second material (and potentially even further materials) is loaded into the mold, the above ranges may apply to the ratio of the amount of energy absorbed by the first material to the total amount of energy absorbed by all materials within the mold plus the energy absorbed by the mold.

As already mentioned numerous times, the inventive manufacturing method may allow selectively supplying energy to regions where it is needed for the fusing of the particle surfaces. It may, in particular, be possible by a suitable choice of the materials used for the mold to have the mold absorb only an insignificant amount of energy from the electromagnetic field. For one thing, this makes the manufacturing method more energy efficient. It may also help to prevent the mold from heating up noticeably, which in turn may shorten the cooling process significantly. A preheating of the mold may also be avoided. The above mentioned ratios of the amount of energy which is absorbed by the first material with the particles to the total amount of energy which is absorbed by all materials in the mold plus the mold itself have turned out to be realistic.

However, a method for the manufacture of sporting goods may also involve a step of heating or preheating at least part of the walls of the mold. In this way, the surface quality may be improved and a better packing of the particles up to the mold surface may be achieved. One possible way of achieving this may be achieved by applying a material to the mold surfaces that has a higher dielectric loss than material of the mold surface and so absorbs some radiation and thus heats up, without melting the material. Another method of achieving this manufacturing step could also be using a tool (e.g., a laser sintered tool which allows for more complex channels and also channels closer to the mold surface) to allow heating of the mold through passing a fluid around/through the tool. The fluid should have a low dielectric loss factor. In general, heating above the melting temperature of the components would lead to the component walls being melted, which is not desirable. It should be noted that care should be taken when heating the mold to a temperature near to, at, or above the glass transition temperature of the materials as the dielectric absorption of materials changes drastically in polymers above this value, i.e. increased absorbtion would mean that heating would rapidly ramp up over this temperature. Therefore, in some cases, heating the mold to a temperature near to, at, or above the glass transition temperature of the material should be avoided.

Any mold manufacturing method known in the art may be used to construct a mold for use in the methods described herein.

For example, a mold may comprise an epoxy resin, in whole or in part. Other mold materials can also be used in connection with the manufacturing method. For example, the manufacturing method may involve the step of providing a mold of PTFE, PE, PEEK, or other materials which are structurally stable during electromagnetic field application. Providing such structurally stable materials can improve the step of fusing the surfaces of particles.

The use of an epoxy resin may also facilitate the manufacture of molds with complex three-dimensional geometry. Furthermore, an epoxy resin may be provided electrically non-conductive, such that for example a heating up of the mold or parts of a mold may be avoided or decreased. A mold or part of a mold made from epoxy resin may be provided basically non-absorbing for electromagnetic radiation, too. However, as discussed above, in some situations an additional step of heating at least part of the mold may be advantageous.

A further aspect of the present invention is provided by a plastic component, in particular a cushioning element for sports apparel, manufactured with an embodiment of the inventive method.

A further aspect of the invention relates to a shoe, in particular a sports shoe, with such a cushioning element. The shoe may e.g. be a running shoe.

By use of the inventive manufacturing method for the manufacture of such a plastic component, the properties of the manufactured plastic component may be selectively and locally influenced without necessitating a complicated set up of the manufacturing device. Moreover, the manufacture may be energy efficient and environmentally friendly and may be completed in comparatively little time. Hence, the inventive manufacturing method can be suitable for use in mass production, for example the manufacture of shoes with soles or parts of soles manufactured by use of the inventive method. Moreover, the method may be automated to a large degree and different kinds of plastic components may be manufactured with a single manufacturing device, for example by adapting the frequency, intensity, duration of radiation, focusing, and other properties of the electromagnetic field(s) to the respective requirements for each plastic component.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Possible embodiments of the inventive method are described in the following detailed description primarily with respect to cushioning elements for sports apparel, in particular soles for shoes. It is, however, emphasized that the present invention is not limited to these embodiments. To the contrary, it may also be used for plastic components for the automotive industry, for example for the manufacture of bumpers, fenders, panel-elements, seat shells or arm rests, for plastic components for the aviation and aerospace industry, for plastic components for the packing industry, for plastic components for sports equipment, and so forth.

Reference is further made to the fact that in the following only embodiments of the invention can be described in more detail. The skilled person will understand, however, that the optional method steps and possible modifications described with reference to these specific embodiments may also be modified or combined with one another in a different manner within the scope of the invention, and that individual steps or optional features of the method may also be omitted, if these seem dispensable. In order to avoid redundancies, reference is therefore made to the explanations in the preceding sections, which also apply to the following detailed description.

FIGS. 1*a-i* illustrate embodiments of an inventive method 100 for the manufacture of a plastic component. These are schematic representations, such that the proportions shown in FIGS. 1*a-i* need not necessarily match the actual proportions in a real-life application of the method 100. Rather, FIGS. 1*a-i* serve the purpose of indicating to the skilled person the scope of the present invention including potential design options and modifications of the method 100, as well as the different possibility to adapt the method 100 according to a given set of requirements.

The method 100 comprises the step of loading a mold 110 with a first material comprising particles 120 of an expanded material, as shown in FIG. 1*a*.

The mold 110 may, for example, comprise two or more mold parts 112, 113 which may be movable relative to one another. The mold 110 encompasses a cavity 115 having a shape corresponding to the plastic component that is to be manufactured.

The mold 110 or the mold parts 112, 113 may, for example, comprise an epoxy resin. The use of epoxy resin for the manufacture of the mold 110 or the mold parts 112, 113 may allow providing molds 110 comprising a cavity 115 with a very complex three-dimensional geometry. Hence, also complexly shaped plastic components may be manufactured with the inventive manufacturing method 100. However, also other mold materials can also be used in connection with the method 100. For example, the method 100 may involve the step of providing a mold 110 of PTFE, PE, PEEK, or other materials which are structurally stable during electromagnetic field application.

The loading of the mold 110 with the first material comprising the particles 120 of the expanded material may, for example, proceed via a feed line 118 that is connected via an inlet with the cavity 115 of the mold 110. It is also possible that the loading proceeds by a plurality of feed lines and inlets. Alternatively or in addition, the loading may also proceed by the movable mold parts 112, 113 of the mold 110 initially being moved apart from one another, such that one or more openings are created between the mold parts 112, 113 through which the loading proceeds (this option is not explicitly shown in the figures). After the loading of the mold 110 is completed, the movable mold parts 112, 113 may be moved together and/or the inlet(s) may be closed, such that the cavity 115 forms a closed molding chamber. FIG. 1*b* shows the closed mold 110 loaded with the first material with the particles 120 of the expanded material.

The particles 120 may be randomly arranged. However, the particles 120 or at least some of the particles 120 may also be aligned to each other or be otherwise intentionally arranged within the mold 110.

The particles 120 may, for example, comprise one or more of the following materials: expanded thermoplastic polyurethane (eTPU), expanded polyamide (ePA), and/or expanded polyether-block-amide (ePEBA). Other materials that can be used include PLA, PEBA, PET, PBT and TPEE. The first material may only comprise one kind of particles 120. It is, however, also possible that the first material with which the mold 110 is loaded comprises a mixture of different kinds of particles 120. For example, the particles 120 may differ in their material, shape, size, color, density, and/or combinations thereof, as well as their respective expanded material.

It is also possible that the particles 120 comprise an energy absorbing material that absorbs the energy supplied by the at least one electromagnetic field—as further described below—and that therefore contributes to the fusing of the surfaces of the particles 120. This energy absorbing material may, for example, be added to the particles 120 prior to the loading of the mold 110. For example, the particles 120 may be provided with the energy absorbing material prior to loading of the mold 110 by storing them in the material or intermixing them with the material. It is also possible that the energy absorbing material is added to the particles 120 during the loading of the mold 110, as shown in FIG. 1*a*, for example by means of a hopper 119 in the feed line 118.

In the simplest case, the particles 120 are provided with a constant amount of the energy absorbing material. That is, the amount of energy absorbing material is essentially the same for all particles 120. Herein, "essentially the same" may mean: as far as the method used for the addition of the energy absorbing material and the variation in the size of the particles 120 allows. Hence, in this case, there may be an essentially homogeneous distribution of the energy absorbing material within the first material with the particles 120.

It is, however, also possible that the added amount of energy absorbing material per particle 120 varies within the mold 110. This may, for example, be achieved in that, prior to the loading of the mold 110, mixtures of particles 120 and energy absorbing material are prepared which each comprise a different content of energy absorbing material, and with whom the mold 110 is subsequently loaded according to the desired distribution of the energy absorbing material within the mold 110. Or, the amount of energy absorbing material added through the hopper 119 is varied accordingly during the loading of the mold 110.

By means of a varying amount of energy absorbing material, the amount of energy supplied to the particles 120 by the electromagnetic field (the step of supplying energy in the form of at least one electromagnetic field will be further discussed below), i.e. the amount actually absorbed by the particles, may be locally influenced. For example, the amount of energy absorbed by the particles from the electromagnetic field may be proportional to the amount of energy absorbing material a given particle 120 comprises. The amount of energy a particle 120 absorbs may in turn have an influence on how strongly the surface of the particle 120 is fused with the surfaces of its neighboring particles. For example, the surface of the particle 120 may be fused together with the surfaces of the neighboring particles the stronger, the more energy is supplied to and absorbed by the particle 120.

Figure 1C:
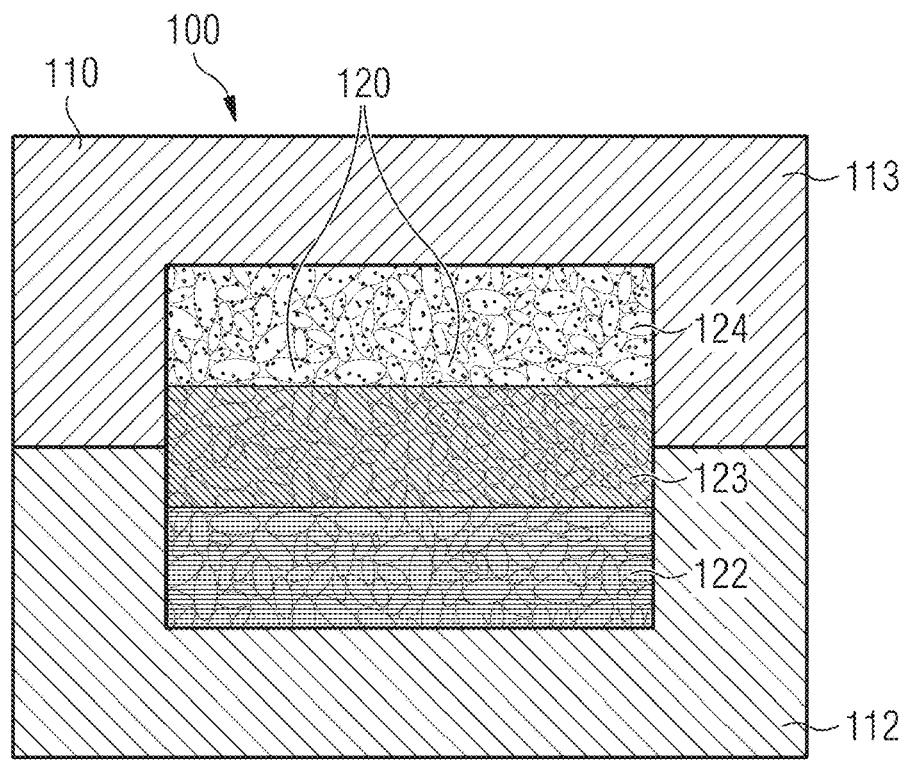

For example, FIG. 1*c* illustrates the case in which the mold 110 is loaded with three layers 122, 123 and 124 of particles 120, wherein the three layers 122, 123 and 124 each comprise a different amount of energy absorbing material per particle 120. In the case shown here, the bottom layer 122 comprises the largest amount of energy absorbing material per particle 120 and the top layer 124 the smallest amount. As already mentioned, the amount of energy absorbing material per particle 120 may also vary in a different manner within the mold 110, in order to adjust the desired degree of the fusing of the surfaces of the respective particles 120 locally.

The energy absorbing material may, for example, comprise water or be comprised of water, or it may be comprised of a material which comprises a metal, for example a metal powder like iron filings. The choice of the energy absorbing material may depend on the way in which the energy that leads to the fusing of the surfaces of the particles 120 is supplied.

Speaking of which, the method 100 comprises in a further step the fusing of the surfaces of the particles 120 by supplying energy, wherein the energy is supplied in the form of at least one electromagnetic field 130, 140.

Figure 1D:
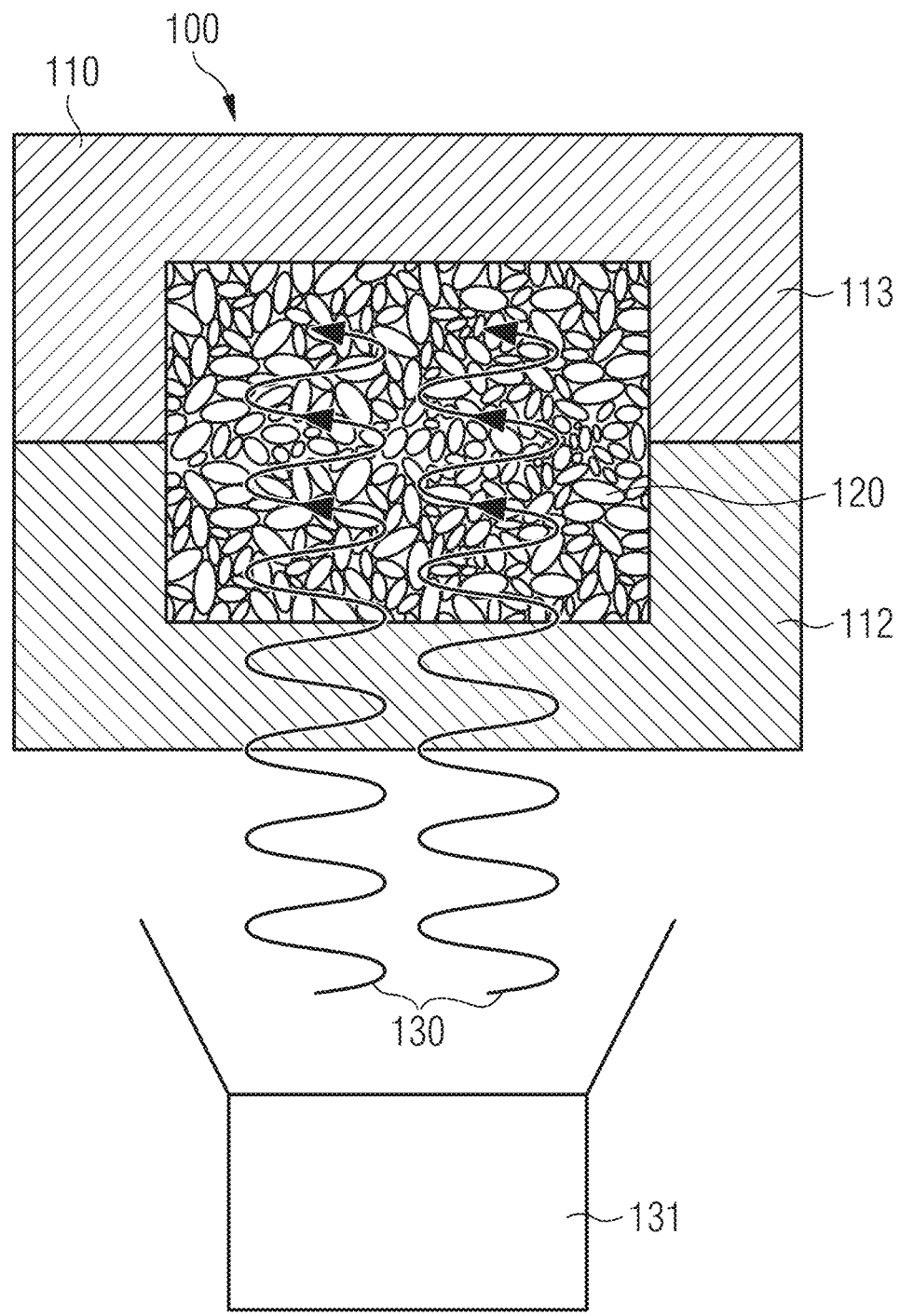

The energy may, for example, be supplied in the form of electromagnetic radiation 130, as shown e.g. in FIG. 1d. Herein, the radiation 130 may be emitted from a radiation source 131.

The radiation 130 may, for example, be radiation 130 in the microwave range, i.e. radiation with a frequency in the range from 300 MHz to 300 GHz. The radiation 130 may also be radiation in the radiofrequency range, i.e. radiation with a frequency in the range from 30 kHz to 300 MHz.

It is further possible that the energy is supplied in the form of radiation 130 in a frequency range different from the frequency ranges just mentioned. As a specific example, the energy may be supplied in the form of infrared (IR) radiation 130. The use of ultraviolet (UV) radiation 130 may also be considered.

If the radiation 130 is radiation in the microwave range, water can be well suited as an energy absorbing material, because irradiating water with microwave radiation leads to a heating up of the water. Also for radiation 130 in the radiofrequency range or infrared range, water may be considered as energy absorbing material.

As shown e.g. in FIG. 1e, the energy may further be supplied by electromagnetic induction. To this end, e.g. an induction generator 141 (also multiple induction generators are possible) generates an electromagnetic field 140 which comprises a magnetic flux Φ that varies over time. When using electromagnetic induction, the particles 120 preferably comprise an energy absorbing material that possesses a certain electric conductivity, for example a metal powder like iron filings. Then, the time varying magnetic flux Φ can create eddy currents in this electrically conducting material which heat up the material and hence contribute to the fusing of the surfaces of the particles 120.

In the embodiments shown in FIGS. 1d and 1e, all partial regions of the mold 110 are provided with approximately the same amount of energy in the form of the electromagnetic fields 130, 140. It must be kept in mind, however, that the amount of energy that is supplied to the particles 120 for the fusing of the surfaces, i.e. the amount of energy that is actually absorbed by them, does not only depend on the amount of energy that is made available by the electromagnetic fields 130, 140 in the first place, but also on the percentage of the available energy that the particles 120 actually extract from the electromagnetic fields 130, 140. As already explained above, this may be controlled by providing the particles 120 with an energy absorbing material or by varying its dosage in different partial regions of the mold 110, for example.

Alternatively or in addition, it is also possible that the amount of energy supplied to the particles 120 is influenced by means of varying the amount of energy that is made available by the electromagnetic fields for the different partial regions of the mold in the first place.

Figure 1F:
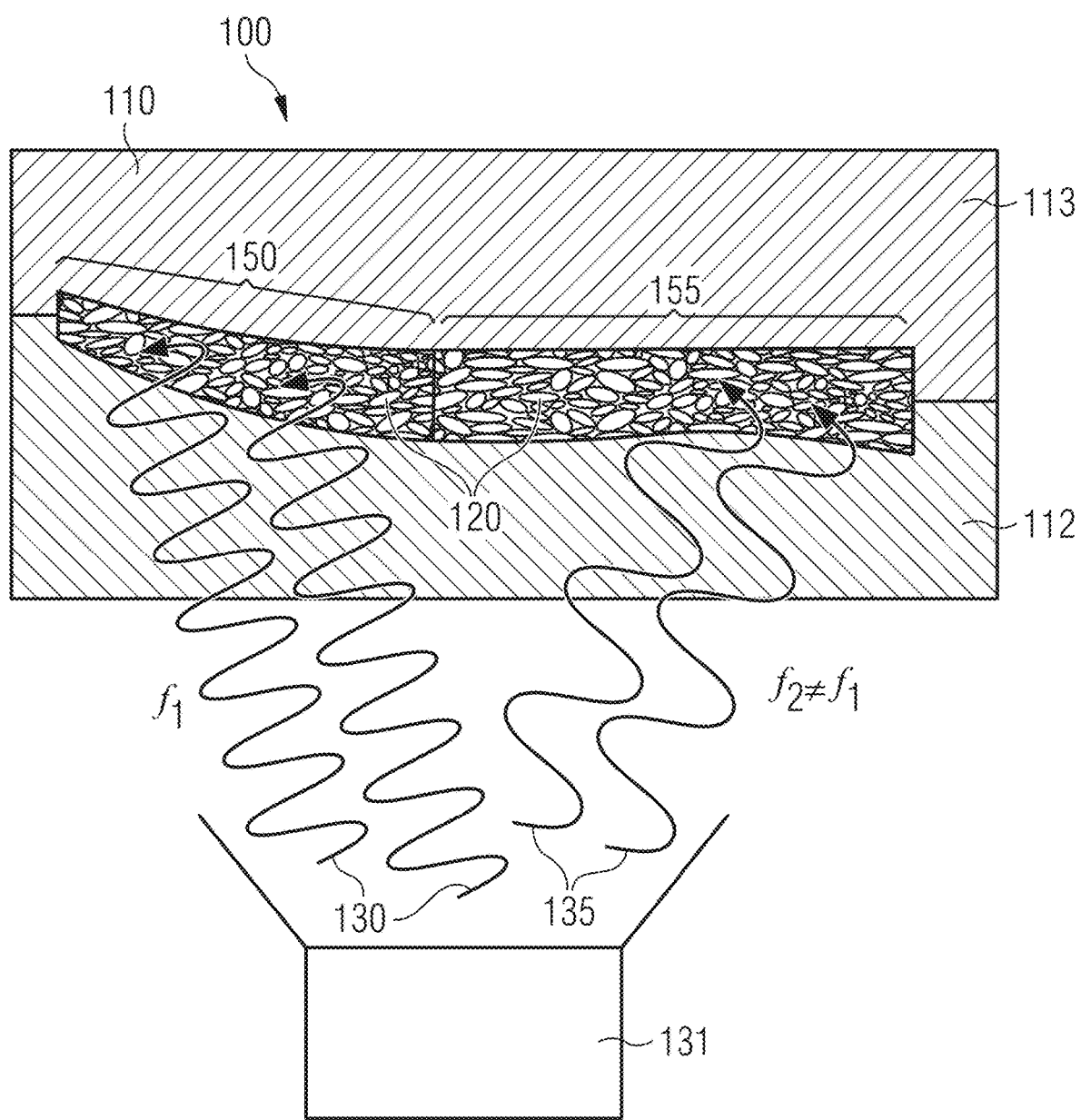
Figure 1G:
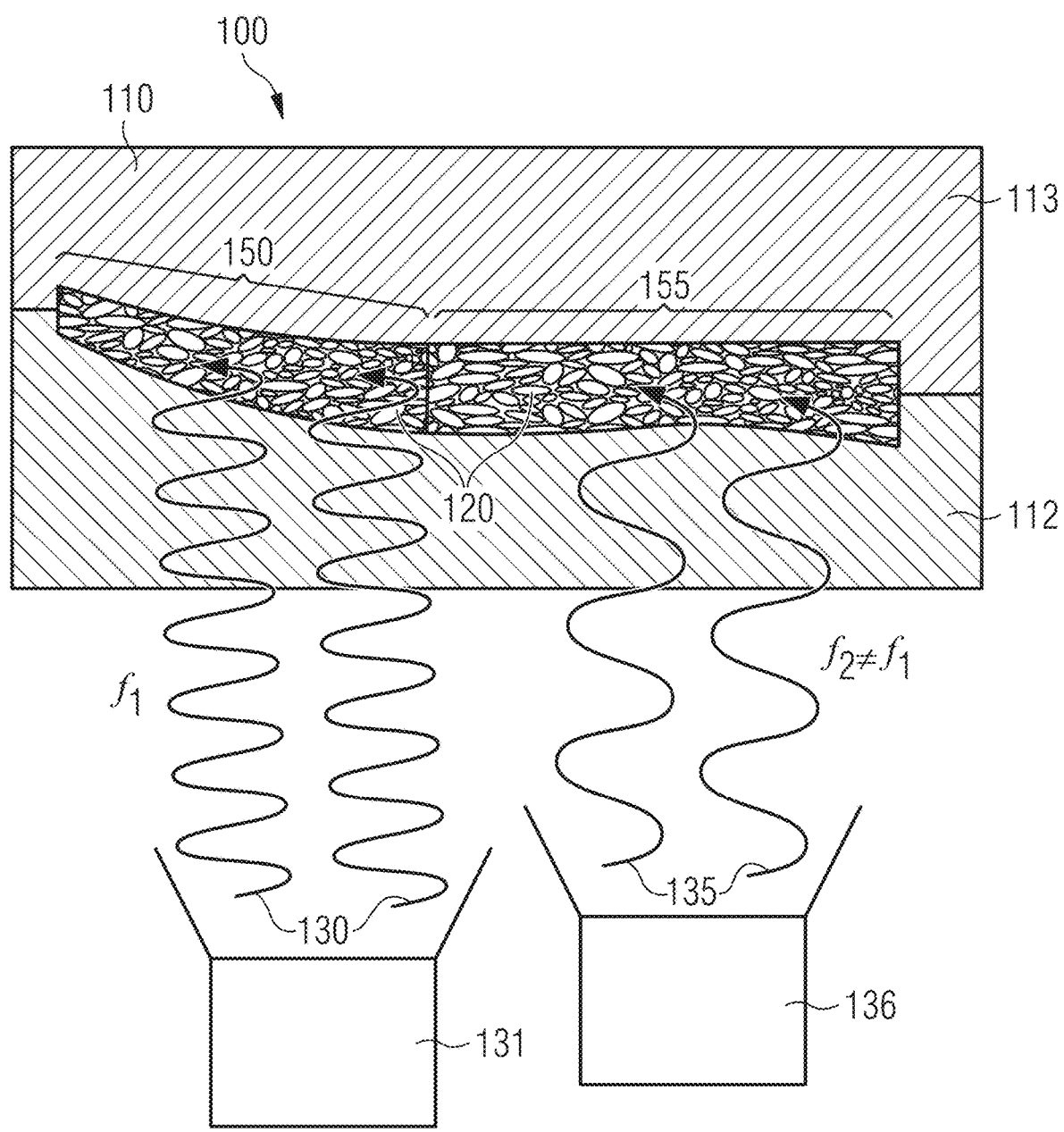

For example, FIGS. 1f and 1g show embodiments wherein more energy is made available in a first partial region 150 of the mold 110 than in a second partial region 155. This is achieved in that the first partial region 150 is irradiated with electromagnetic radiation 130 with a frequency f1 and the second partial region 155 is irradiated with electromagnetic radiation 135 with a frequency f2, wherein the frequency f1 is higher than the frequency f2. Both frequencies f1 and f2 may, for example, be chosen from the above mentioned frequency ranges (microwaves, radio waves, infrared, UV) or from one or more different frequency ranges. As a result, the radiation 130 "transports" more energy into the first partial region 150 of the mold 110 than the radiation 135 transports into the second partial region 155 of the mold 110. As shown in FIG. 1f, it is possible that both kinds of radiation 130 and 135 are emitted from a single radiation source 131. To this end, the radiation source 131 may, for example, comprise a device for doubling the frequency. It is, however, also possible, as shown in FIG. 1g, that each of the two kinds of radiation 130 and 135 is emitted from a respective separate radiation source 131 and 136.

Figure 1H:
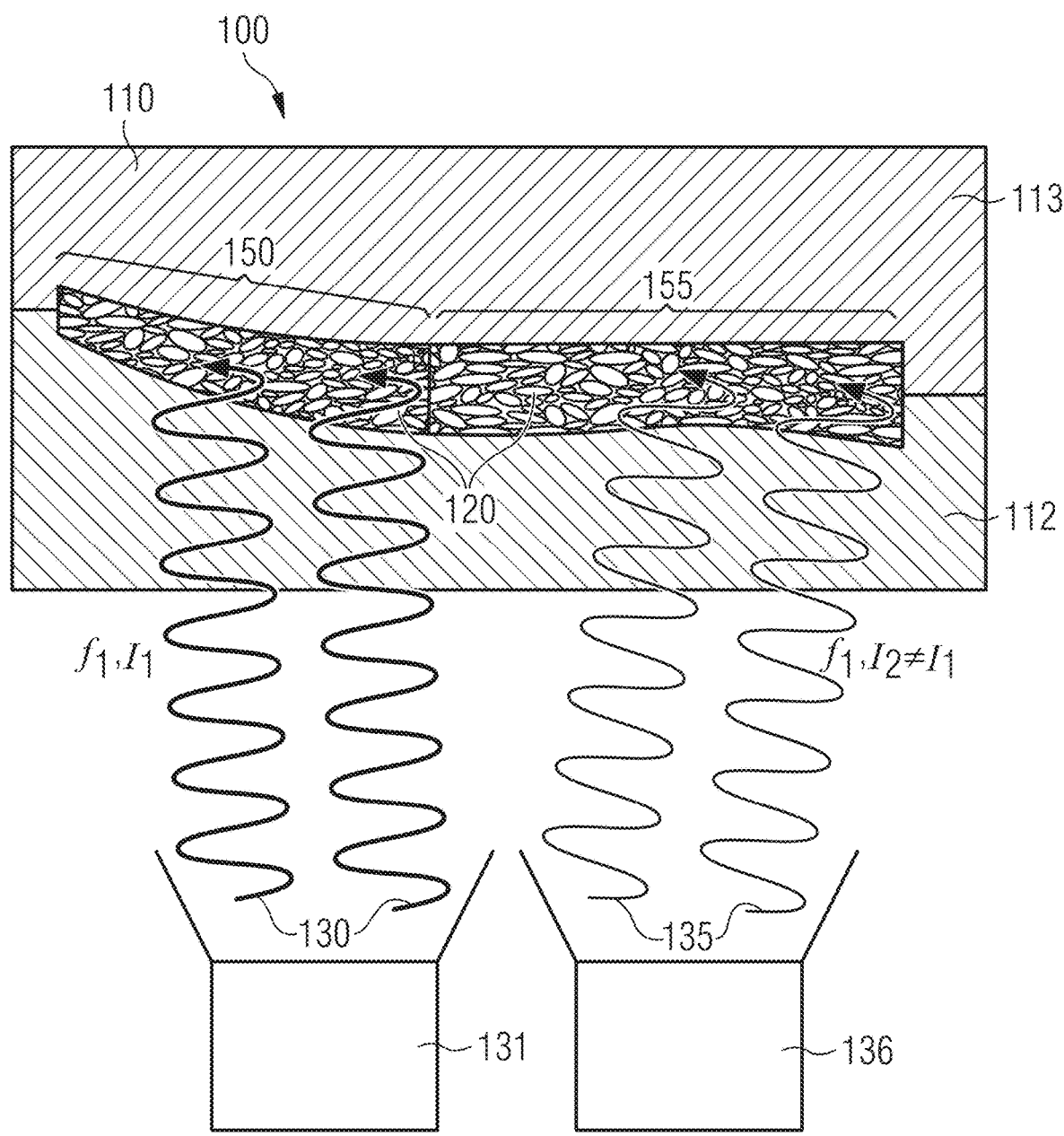

Influencing the available amount of energy is, however, not only possible by means of a variation of the frequency. FIG. 1h, for example, shows an embodiment wherein the amount of energy made available for the partial regions 150 and 155 of the mold 110 is controlled via the intensity of the radiation 130 and 135 incident in these regions. Here, intensity designates the incident amount of energy per unit area and unit time of the electromagnetic radiation. In general, it is proportional to the square of the amplitude of the incident radiation.

While in the embodiment shown in FIG. 1h both kinds of radiation 130 and 135 have the same frequency f1 and the radiation 130 has the intensity I1 that is higher than the intensity I2 of the radiation 135, it is clear to the skilled person that, in other embodiments, a variation of the intensity may be combined with a variation of the frequency, and that it is generally also possible to use more than two different kinds of radiation.

Reference is further made to the fact that also for the creation of two or more radiations 130, 135 with different intensities, a single radiation source may be used. However, in FIG. 1h the radiation 130 with the higher intensity I1 is emitted by the radiation source 131 and the radiation 135 the lower intensity I2 from the separate radiation source 136.

In addition, in the embodiments shown in FIGS. 1f-h, the first radiation 130 only irradiates the first partial region 150 and the second radiation 135 only the second partial region 155. However, in different embodiments (not shown), it is also possible that a first electromagnetic field, for example the field 135 from the source 136, provides the entire mold 110 with a basic amount of energy as a base field and that an increase in the energy made available in one partial region of the mold 110, e.g. an increase of the energy made available in the partial region 150, is achieved by irradiating this partial region with radiation from an additional radiation source, e.g. with the radiation 130 from the source 131. In other words, individual partial regions of the mold 110 may be provided with additional energy by additional electromagnetic fields, e.g. in the form of radiation or electromagnetic induction.

Reference is again made to the fact that the amount of energy actually supplied to and absorbed by the particles 120 in general also depends on further factors, in particular the amount of potentially added energy absorbing material and the absorbing power of the expanded material of the particles 120 itself It is again highlighted that an advantage of the present method 100 may be that the mold 110 only absorbs a limited amount of energy compared to the first material with the particles 120. For example, the use of epoxy resin for the manufacture of molds 110 has turned out advantageous. Epoxy resin may be processed to molds 110 with complexly shaped cavities 115 and it can comprise a low absorption power with respect to electromagnetic fields. Other methods known in the art for the manufacture of a mold with low absorption capabilities may also be used.

A ratio of the amount of energy absorbed by the first material with the particles 120 divided by the total amount of energy which is absorbed by first material and the mold 110 may lie in the range 1.0-0.2, or in the range 1.0-0.5, or even better in the range 1.0-0.8. The exact value of this ratio will in general depend on a plurality of factors like, for example, the material used for the manufacture of the mold 110, its mass, and the kind of electromagnetic field(s) used. The higher this ratio is, the higher the amount of energy that is utilized for fusing the particle 120 and the lower the amount of energy that is "lost" in the mold 110.

A further embodiment is shown in FIG. 1*i*, wherein the mold 110 was further loaded with a second material 160 which remains essentially unaltered by the used electromagnetic field 140. "Essentially unaltered" may mean that the amount of energy absorbed by the second material 160 is not enough to melt or start melting the second material 160 or to soften or harden it.

While in the embodiment shown in FIG. 1*i* the energy is supplied via electromagnetic induction 140, reference is made to the fact that the following explanations also apply when supplying the energy by means of a different electromagnetic field, for example via electromagnetic radiation like the radiations 130 or 135. For reasons of conciseness, reference is made to the field 140 in the following.

The second material 160 may, for example, in itself comprise a low absorption power with regard to the used electromagnetic field 140. In particular, the second material 160 may be free from energy absorbing material or comprise a lower content of energy absorbing material than the first material with the particles 120. The second material 160 may, for example, also comprise particles of an expanded material like eTPU, ePA and/or ePEBA, but without or with less energy absorbing material.

The particles of the second material may be randomly arranged. Or, the particles or at least some of the particles of the second material may be aligned to each other or be otherwise intentionally arranged within the mold 110.

The second material 160 may also comprise a different foamed or un-foamed plastic material. The second material 160 may, for example, comprise foamed ethylene-vinyl-acetate (EVA).

Optionally, the mold may also be loaded with further materials, in particular with further materials which also remain essentially unaltered by the electromagnetic field 140. For example, in the embodiment shown in FIG. 1*i*, the mold 110 was loaded with a third material 165 which remains essentially unaltered by the electromagnetic field 140. The third material 165 may, for example, be rubber. With regard to such further materials, the considerations made with respect to the second material 160 analogously apply.

In the embodiment shown in FIG. 1*i*, the first material with the particles 120, the second material 160, and third material 165 are arranged in a layered manner. The skilled person will understand, however, that the first material, the second material 160, and potential further materials may also be arranged in a multitude of different arrangements within the mold 110. Hence, the inventive method 100 allows the manufacture of many differently shaped plastic components.

The shape of the mold 110 and the positioning of the first material with the particles 120 as an intermediate layer between a top player with the second material 160 (for example foamed EVA) and a bottom layer with the third material 165 (for example rubber) as shown in FIG. 1*i* may be well suited for the manufacture of a cushioning element for sports apparel, e.g. a shoe sole or a part thereof. A shoe sole manufactured in this way may then be further processed to a shoe, for example a sports shoe.

Finally, reference is again made to the fact that when performing the method 100, the options and design possibilities discussed herein may be combined with one another arbitrarily, and that the embodiments explicitly discussed herein only provide some specific examples to facilitate the understanding of the invention. The inventive method 100 may, however, not be limited to the embodiments explicitly described herein.

Figure 2A:
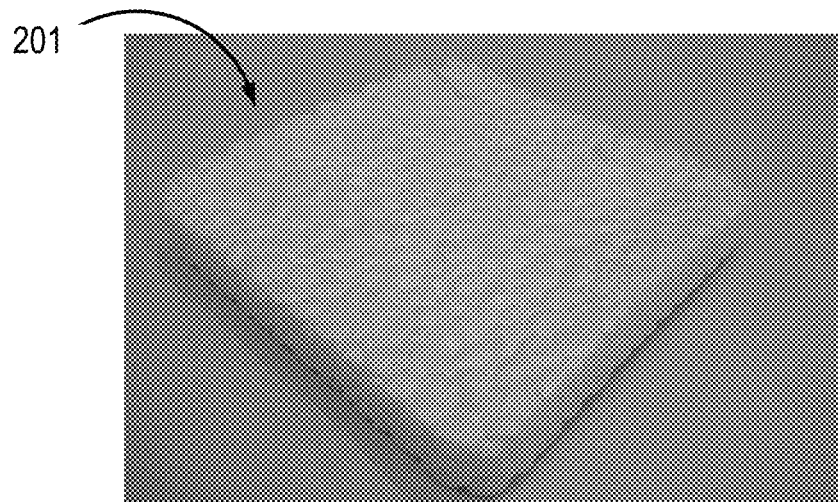
FIGS. 2a-c are examples for plastic components manufactured according to an exemplary manufacturing method.
Figure 2B:
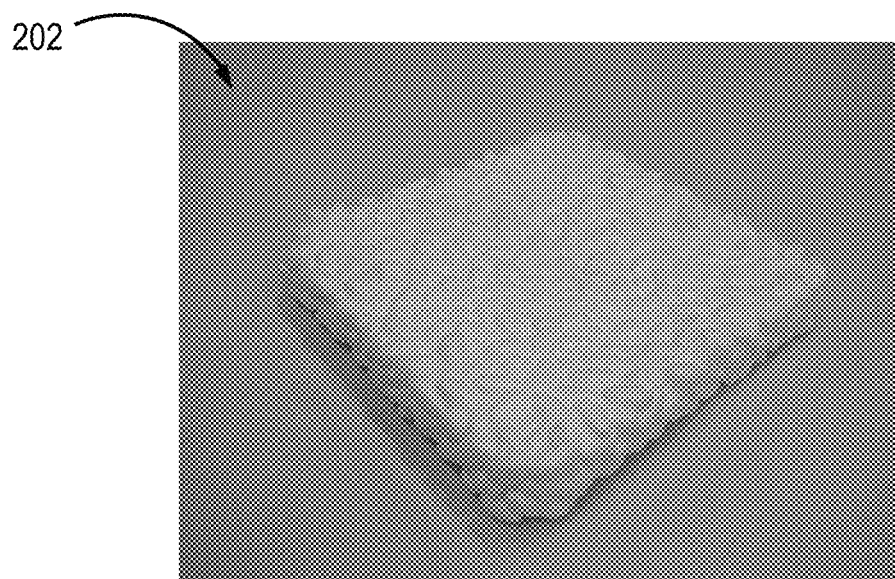
Figure 2C:
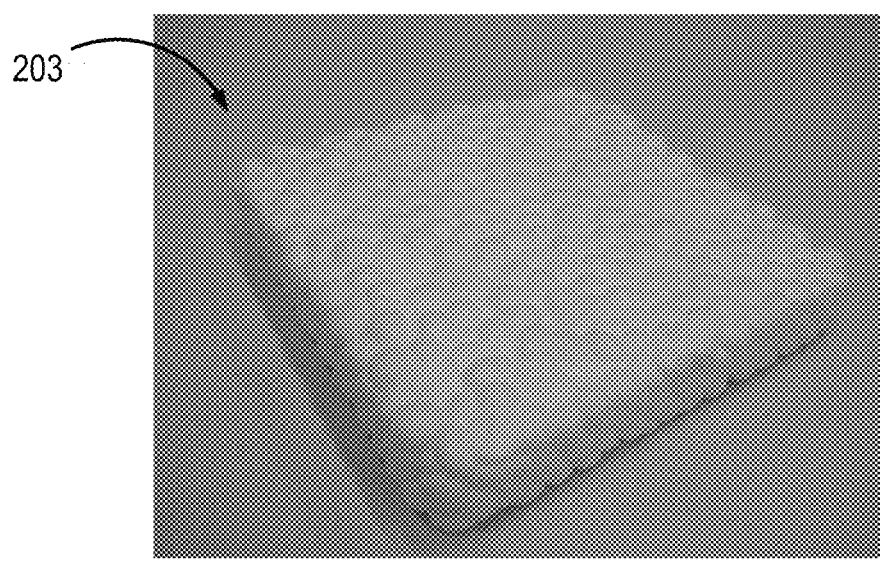

FIGS. 2*a-c* show exemplary plastic components 201-203 that may be manufactured according to the methods described herein. Therein, plastic component 201 comprises particles of ePEBA, whereas plastic components 202-203 each comprise particles of eTPU.

It is noted that some edges of the plastic components 201-203 as shown in FIGS. 2*a-c* have been cut such that not all edges have a surface structure as created by fusing the plastic components in a mold.

In the following, further examples are described to facilitate the understanding of the invention:

1. Method for the manufacture of a plastic component, in particular a cushioning element for sports apparel, comprising:
   a. loading a mold with a first material which comprises particles of an expanded material; and
   b. fusing the surfaces of the particles by supplying energy,
   c. wherein the energy is supplied in the form of at least one electromagnetic field.
2. Method according to the preceding embodiment 1, wherein the particles comprise one or more of the following materials: expanded thermoplastic polyurethane, eTPU; expanded polyamide, ePA; expanded polyetherblockamide; ePEBA.
3. Method according to any one of the preceding embodiments 1-2, wherein the particles further comprise an energy absorbing material, which absorbs the energy supplied by the at least one electromagnetic field such that the energy absorbing material contributes to the fusing of the surfaces of the particles.
4. Method according to the preceding embodiment 3, wherein the particles are provided with the energy absorbing material prior to the loading of the mold.
5. Method according to any one of the preceding embodiments 3-4, wherein the energy absorbing material comprises water.
6. Method according to any one of the preceding embodiments 3-5, wherein the energy absorbing material comprises a metal.

7. Method according to any one of the preceding embodiments 1-6, wherein the energy is supplied in the form of radiation in the microwave range, 300 MHz-300 GHz.
8. Method according to any one of the preceding embodiments 1-7, wherein the energy is supplied in the form of radiation in the radio frequency range, 30 kHz-300 MHz.
9. Method according to any one of the preceding embodiments 1-8, wherein the energy is supplied by electromagnetic induction.
10. Method according to any one of the preceding embodiments 1-9, wherein more energy is supplied to the particles in a first partial region of the mold than in a second partial region of the mold.
11. Method according to any one of the preceding embodiments 1-10, wherein energy is supplied to the particles in a first partial region of the mold with an electromagnetic field with a first frequency (f1) and in a second partial region of the mold with an electromagnetic field with a second frequency (f2), wherein the second frequency (f2) is different from the first frequency (f1).
12. Method according to any one of the preceding embodiments 3-11, wherein the average amount of energy absorbing material per particle varies within the mold.
13. Method according to any one of the preceding embodiments 1-12, wherein the mold is further loaded with a second material, which remains essentially unaltered by the at least one electromagnetic field.
14. Method according to the preceding embodiment 13, wherein the second material also comprises particles of an expanded material, in particular particles of eTPU, ePA, and/or ePEBA.
15. Method according to any one of the preceding embodiments 1-14, wherein a ratio of the amount of energy absorbed by the first material to the total amount of energy absorbed by the first material and the mold lies in the range 1.0-0.2, preferably in the range 1.0-0.5, and particularly preferably in the range 1.0-0.8.
16. Method according to any one of the preceding embodiments 1-15, wherein the mold comprises an epoxy resin.
17. Plastic component, in particular cushioning element for sports apparel, manufactured with a method according to any one of the preceding embodiments 1-16.
18. Shoe, in particular sports shoe, with a cushioning element according to embodiment 17.
19. Shoe according to embodiment 18, wherein the shoe is a running shoe.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:
1. A shoe comprising a cushioning element comprising a plastic component, the plastic component comprising a first partial region comprising a first material comprising particles of an expanded material and a second partial region comprising a second material comprising particles of an expanded material,
wherein the particles of an expanded material in the first material and in the second material have the same base material;
wherein the surfaces of the particles in the first partial region are fused to one another through application of energy in the form of at least one electromagnetic field;
wherein the particles in the first partial region comprise an energy absorbing material comprising a metal-powder and/or water, which absorbs the energy supplied by the at least one electromagnetic field such that the energy absorbing material contributes to the fusing of the surfaces of the particles; and
wherein the first partial region has a different thickness, different breathability, or different thickness and breathability than the second partial region.
2. The shoe of claim 1, wherein the particles comprise one or more of the following materials: expanded thermoplastic polyurethane ("eTPU"), expanded polyamide ("ePA"), expanded polyetherblockamide, ("ePEBA"), polylactide ("PLA"), polyether-block-amide ("PEBA"), polyethylene terephthalate ("PET"), polybutylene terephthalate ("PBT"), and thermoplastic polyester ether elastomer ("TPEE").
3. The shoe of claim 1, wherein the particles in the first and/or second partial region are randomly arranged.
4. The shoe of claim 1, wherein the particles in the first and/or second partial region comprise one or more of the following materials: polyamides, polyesters, polyetherketones, polyolefins, or combinations thereof.
5. The shoe of claim 4, wherein the particles comprise polyamide and wherein the polyamide comprises at least one of a homopolyamide, copolyamide, polyetherblockamide, a polyphthalamide, or combinations thereof.
6. The shoe of claim 4, wherein the particles comprise polyetherketone and wherein the polyetherketone comprises at least one of polyether ketone (PEK), polyether ether ketone (PEEK), polyetherketoneketone (PEKK), or combinations thereof.
7. The shoe of claim 4, wherein the particles comprise polyolefin and wherein the polyolefin comprises at least one of polypropylene (PP), polyethylene (PE), olefin co-block polymer (OBC), polyolefin elastomer (POE), polyethylene co-vinyl acetate (EVA), polybutene (PB), polyisobutylene (PIB), or combinations thereof.
8. The shoe of claim 1, wherein the particles in the first and/or second partial region comprise at least one of polyoxymethylene (POM), polyvinylidene chloride (PVCD), polyvinylalcohol (PVAL), polylactide (PLA), polytetrafluoroethylene (PTFE), polyvinylidene fluoride (PVDF), tetrafluoroethylene (FEP), ethylene-tetrafluoroethylene (ETFE), polyvinylfluoride (PVF), perfluoroalkoxy (PFA), thermoplastic polyurethanes (TPU), or combinations thereof.
9. The shoe of claim 1, wherein the first material and/or second material comprise a chain extender.
10. The shoe of claim 9, wherein the chain extender comprises a styrene-acrylate copolymer containing reactive epoxy groups.
11. The shoe of claim 1, wherein the particles in the first and/or second partial region comprise polybutylene terephthalate (PBT) and the chain extender comprises polymeric material containing epoxy groups, pyromellitic dianhydride, styrene maleic anhydride, or combinations thereof.

12. The shoe of claim 9, wherein the particles in the first and/or second partial region comprise polyamide (PA) or polyether-block-amide (PEBA) and the chain extender comprises at least one selected from a polymeric material containing epoxy groups, pyromellitic dianhydride, styrene maleic anhydride, or combinations of one or more thereof.

13. The shoe of claim 9, wherein the particles in the first and/or second partial region comprise thermoplastic polyester ether elastomer (TPEE) and the chain extender comprises at least one selected from a polymeric material containing epoxy groups, pyromellitic dianhydride, styrene maleic anhydride, or combinations of one or more thereof.

14. The shoe of claim 1, wherein the particles of the second material are aligned to each other.

15. The shoe of claim 1, wherein the first partial region has a different thickness than the thickness of the second partial region.

16. The shoe of claim 1, wherein the first partial region has a different stiffness than the stiffness of the second partial region.

17. The shoe of claim 1, wherein the first partial region has a different breathability than the breathability of the second partial region.

* * * * *